United States Patent
Yu et al.

(10) Patent No.: US 12,375,213 B2
(45) Date of Patent: Jul. 29, 2025

(54) USER EQUIPMENT, BASE STATION AND METHOD FOR EXCHANGING SIDELINK INFORMATION

(71) Applicant: LENOVO (BEIJING) LIMITED, Beijing (CN)

(72) Inventors: Xiaodong Yu, Beijing (CN); Lianhai Wu, Beijing (CN); Haipeng Lei, Beijing (CN); Zhennian Sun, Beijing (CN); Jing Han, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 831 days.

(21) Appl. No.: 17/441,556

(22) PCT Filed: Mar. 26, 2019

(86) PCT No.: PCT/CN2019/079737
§ 371 (c)(1),
(2) Date: Sep. 21, 2021

(87) PCT Pub. No.: WO2020/191626
PCT Pub. Date: Oct. 1, 2020

(65) Prior Publication Data
US 2022/0174565 A1    Jun. 2, 2022

(51) Int. Cl.
*H04L 1/1812* (2023.01)
*H04W 76/14* (2018.01)
*H04W 36/00* (2009.01)

(52) U.S. Cl.
CPC .......... *H04L 1/1812* (2013.01); *H04W 76/14* (2018.02); *H04W 36/037* (2023.05)

(58) Field of Classification Search
CPC ....... H04W 92/18; H04W 76/14; H04W 4/40; H04W 72/20; H04W 72/23; H04W 72/02; H04W 72/1263; H04W 76/23; H04W 72/569; H04W 72/21; H04W 24/10; H04W 88/04; H04W 72/12; H04W 4/46
See application file for complete search history.

(56) References Cited

U.S. PATENT DOCUMENTS

| | | | |
|---|---|---|---|
| 2017/0353819 A1* | 12/2017 | Yin | H04W 4/70 |
| 2018/0049196 A1* | 2/2018 | Gupta | H04L 5/0073 |
| 2018/0124771 A1 | 5/2018 | Mok et al. | |
| 2018/0279275 A1* | 9/2018 | Chen | H04W 72/23 |
| 2019/0104546 A1* | 4/2019 | Chendamarai Kannan | H04W 16/14 |

OTHER PUBLICATIONS

International Searching Authority, "Written Opinion of the International Searching Authority," PCT/CN2019/079737, Dec. 23, 2019, pp. 1-5.

(Continued)

*Primary Examiner* — Khalid W Shaheed
(74) *Attorney, Agent, or Firm* — Kunzler Bean & Adamson

(57) ABSTRACT

The present application relates to a first user equipment, a second user equipment, a base station and a method for exchanging a sidelink information. The first user equipment determines an available sidelink process information and transmits the available sidelink process information to the second user equipment or the base station.

18 Claims, 22 Drawing Sheets

(56) References Cited

OTHER PUBLICATIONS

Samsung, Discussion on Physical Layer Procedures, 3GPP TSG RAN WG1 Meeting #95, R1-1812985, Nov. 12-16, 2018, pp. 1-6, Spokane, USA.

Sony, Discussion on HARQ feedback for NR V2X communication, 3GPP TSG RAN WG1 Meeting #95, R1-1813138, Nov. 12-16, 2018, pp. 1-4, Spokane, USA.

Nokia, Nokia Shanghai Bell, Summary of AI 7.2.4.4, QoS Management, 3GPP TSG RAN WG1 Meeting #95, R1-1813941, Nov. 12-16, 2018, pp. 1-6, Spokane, USA.

* cited by examiner

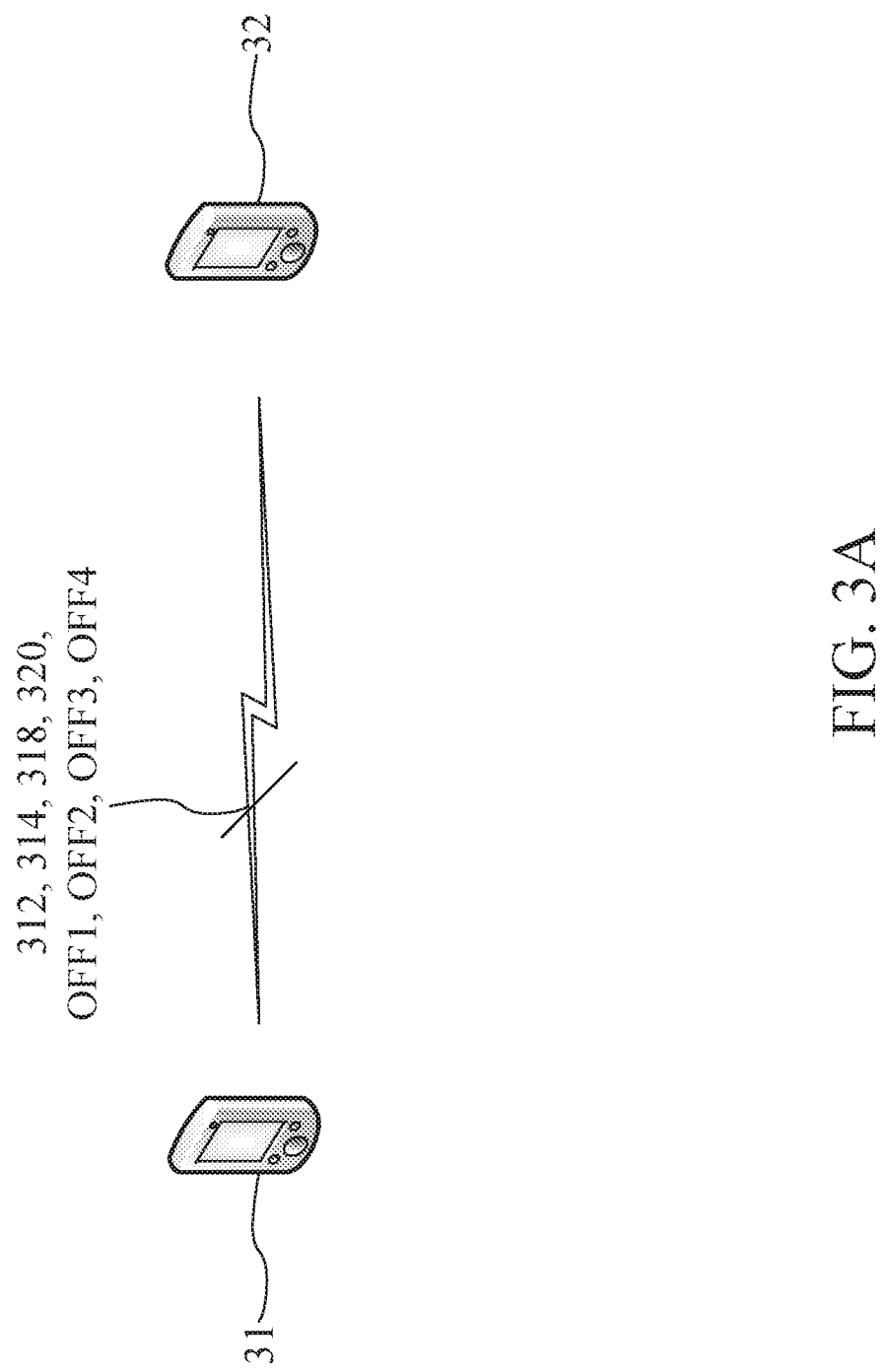

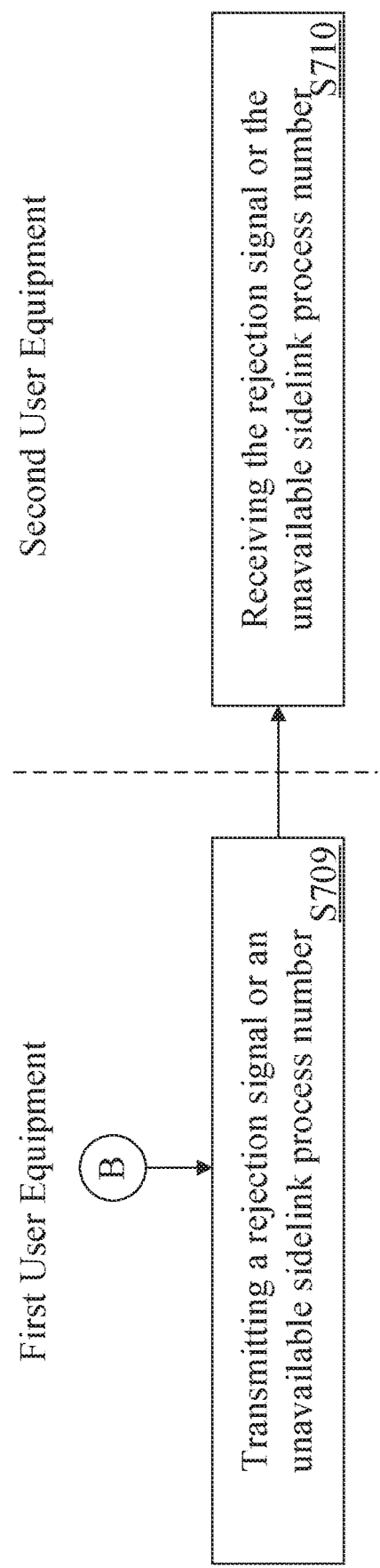
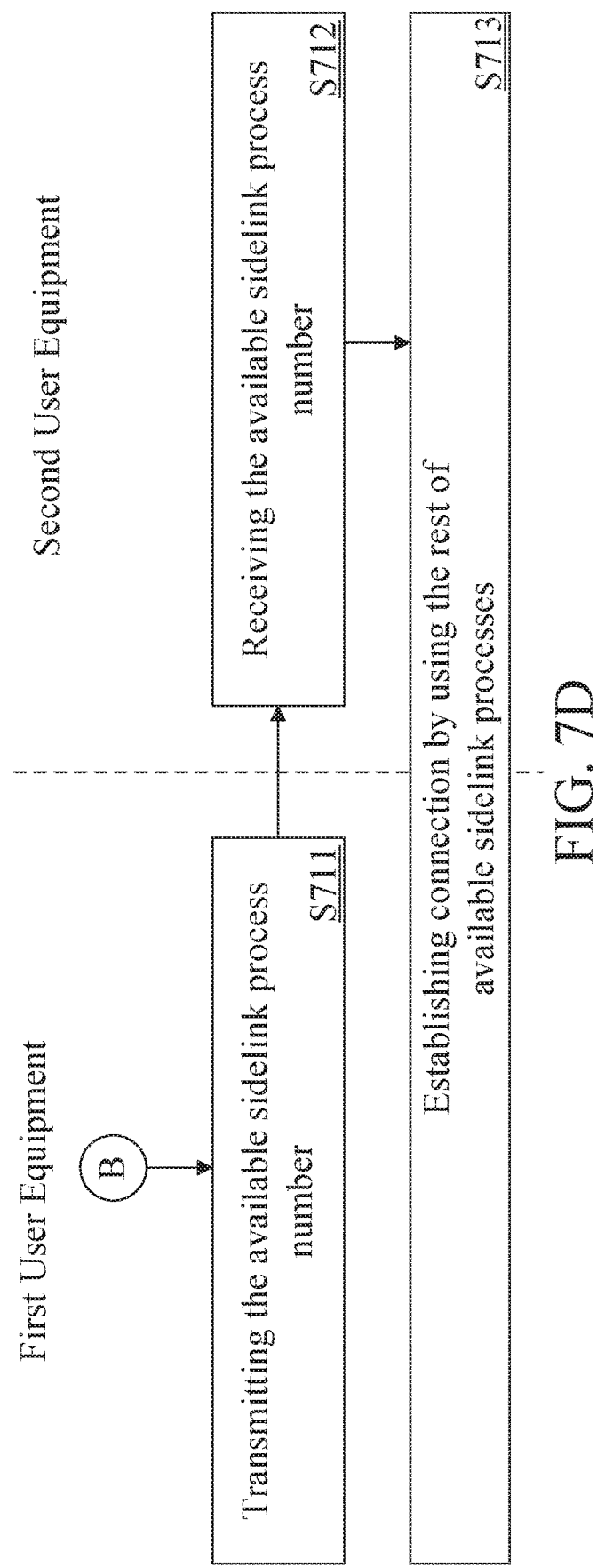
FIG. 7C
FIG. 7D

USER EQUIPMENT, BASE STATION AND METHOD FOR EXCHANGING SIDELINK INFORMATION

TECHNICAL FIELD

The present disclosure generally relates to user equipment, base station and information exchange method thereof, and especially to user equipment, base station and a method for exchanging a sidelink information.

BACKGROUND OF THE INVENTION

In a Long Term Evolution (LTE) network, a User Equipment (UE) Capability Information is a Radio Resource Control (RRC) message used by the UE to inform the base station (BS) of the capability of the UE itself. The user equipment capability information is mainly exchanged between the UE and the BS.

However, the UE Capability Information is not exchanged between UEs directly, since it may impose an extra burden on some network architectures, such as, for example, a vehicle-to-everything (V2X) network architecture, of a next generation cellular mobile communications.

BRIEF SUMMARY OF THE INVENTION

One embodiment of the present disclosure provides a method performed by a user equipment. The method includes: determining, by the user equipment, an available sidelink process information; and transmitting, by the user equipment, the available sidelink process information to another user equipment or a base station.

Another embodiment of the present disclosure provides a method performed by a user equipment. The method includes: transmitting, by the user equipment, a channel busy ratio information to another user equipment.

Yet another embodiment of the present disclosure provides a method for a user equipment. The method includes: receiving, by the user equipment, an available sidelink process information from another user equipment; wherein the available sidelink process information is determined by the another user equipment.

Yet another embodiment of the present disclosure provides a method for a user equipment. The method includes: receiving, by the user equipment, a channel busy ratio information from another user equipment.

Yet another embodiment of the present disclosure provides a method performed by a base station. The method includes: transmitting, by the base station, an available sidelink process request to a use equipment; and receiving, by the base station, the available sidelink process information from the user equipment in response to the available sidelink process request.

Yet another embodiment of the present disclosure provides a method for a base station. The method includes: transmitting, by the base station, a channel busy ratio information request to a user equipment for the user equipment to transmit a channel busy ratio information to another user equipment.

Yet another embodiment of the present disclosure provides a user equipment. The user equipment includes a processor and a transceiver. The processor and the transceiver are electrically coupled. The transceiver determines an available sidelink process information. The transceiver transmits the available sidelink process information to another user equipment or a base station.

Yet another embodiment of the present disclosure provides a user equipment. The user equipment includes a transceiver for transmitting a channel busy ratio information to another user equipment.

Yet another embodiment of the present disclosure provides a user equipment. The user equipment includes a transceiver for receiving an available sidelink process information from another user equipment, wherein the available sidelink process information is determined by the another user equipment.

Yet another embodiment of the present disclosure provides a user equipment. The user equipment includes a transceiver for receiving a channel busy ratio information from another user equipment.

Yet another embodiment of the present disclosure provides a base station. The base station includes a transceiver for transmitting an available sidelink process request to a user equipment, and for receiving an available sidelink process information from the user equipment in response to the available sidelink process request.

Yet another embodiment of the present disclosure provides a base station. The base station includes a transceiver for transmitting a channel busy ratio information request to a user equipment for the user equipment to transmit a channel busy ratio information to another user equipment.

BRIEF DESCRIPTION OF THE DRAWINGS

FIG. 3A is a schematic view of a network system according to an embodiment of the present disclosure.

FIGS. 7A to 7D are flowchart diagrams according to embodiments of the present disclosure.

DETAILED DESCRIPTION OF THE INVENTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Figure 1A:
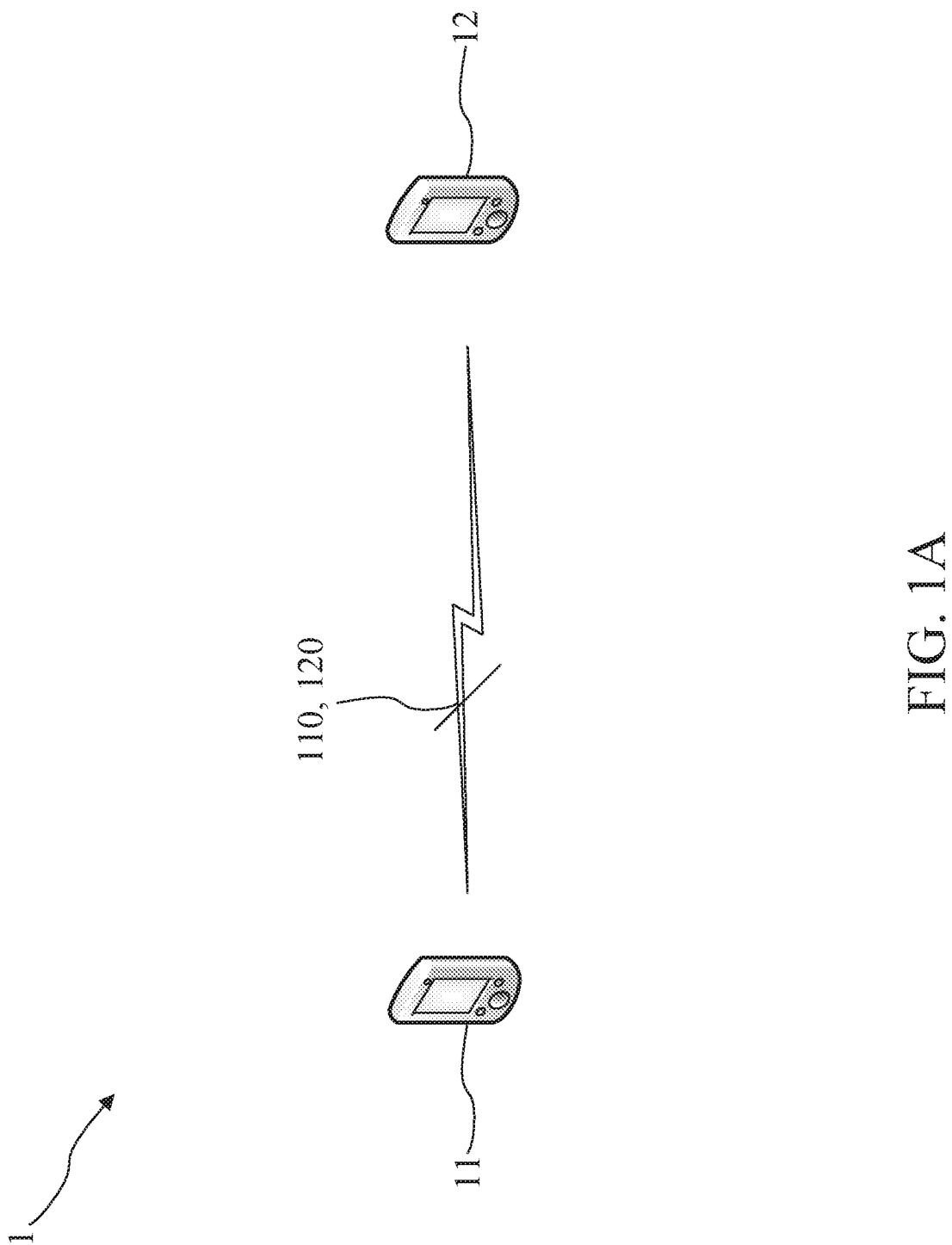
FIGS. 1A and 1B are schematic views of a network system according to an embodiment of the present disclosure.
Figure 1B:
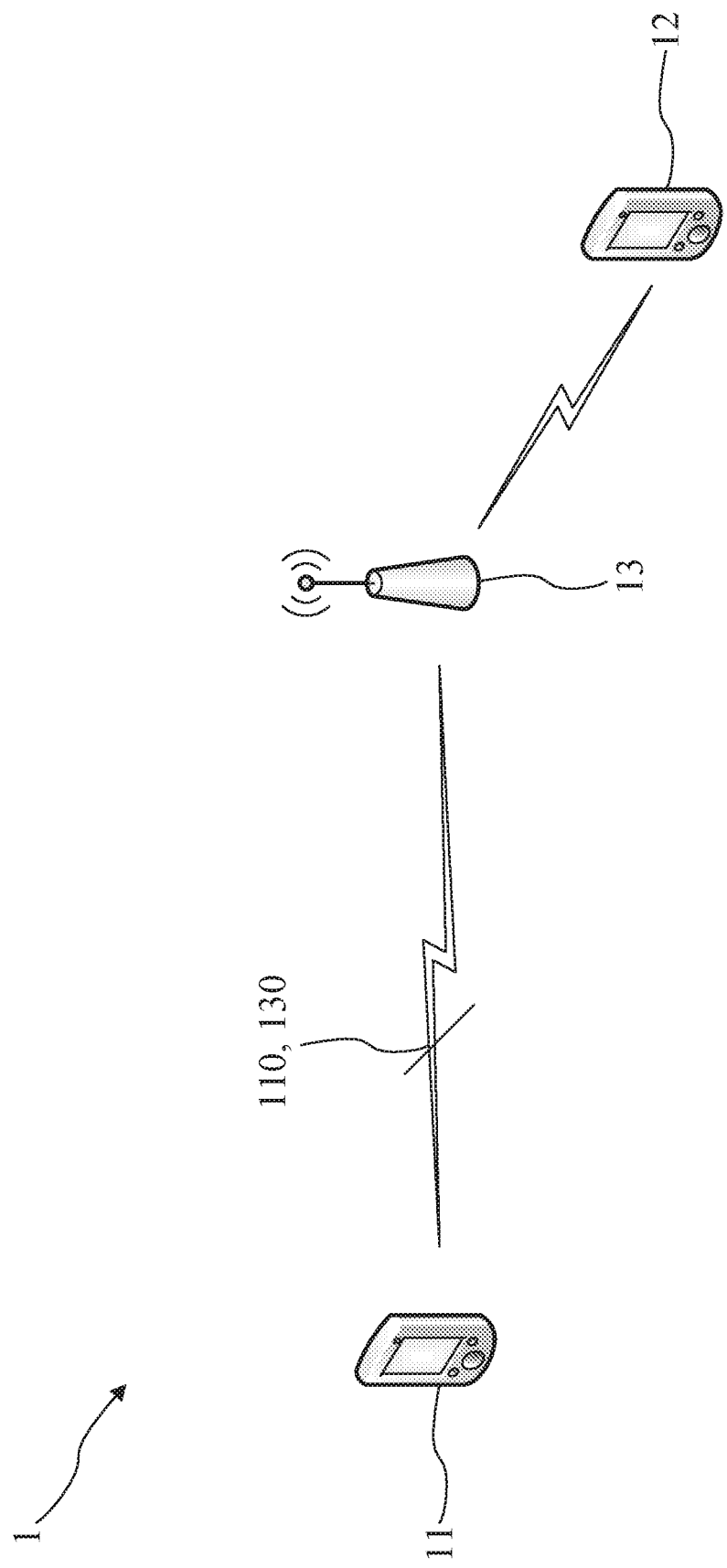
Figure 1C:
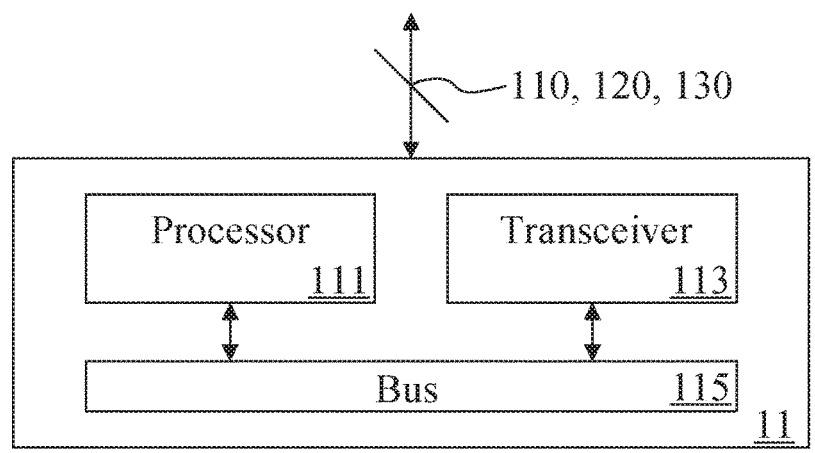
FIG. 1C is a block diagram of a first user equipment according to an embodiment of the present disclosure.

Please refer to FIG. 1A through FIG. 1E. FIGS. 1A and 1B illustrate schematic views of a network system 1 according to an embodiment of the present disclosure. FIG. 1C is a block diagram of a first user equipment 11 according to the embodiment of the present disclosure. The first user equipment 11 includes a processor 111 and a transceiver 113. The processor 111 and the transceiver 113 are coupled through a communication bus 115 allowing the processor 111 to control the transceiver 113 to transmit and/or receive information.

Figure 1D:
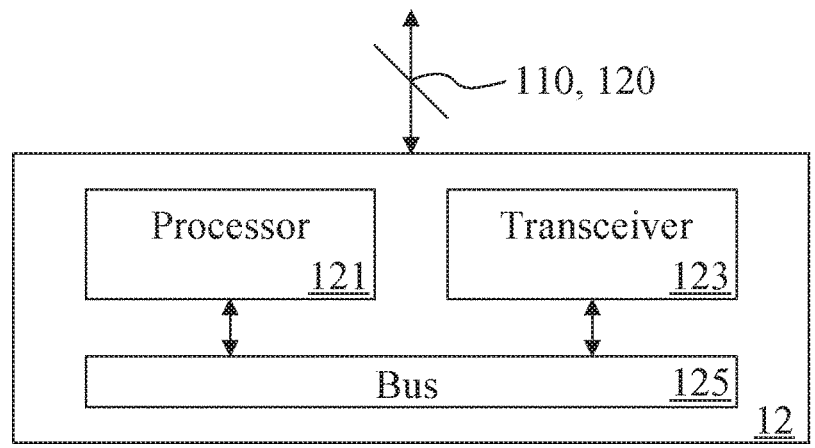
FIG. 1D is a block diagram of a second user equipment according to an embodiment of the present disclosure.
Figure 1E:
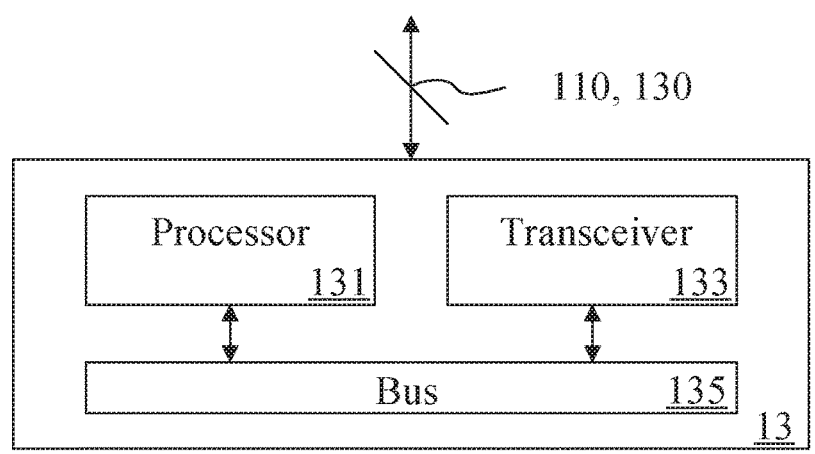
FIG. 1E is a block diagram of a base station according to an embodiment of the present disclosure.

FIG. 1D is a block diagram of a second user equipment 12 according to the embodiment of the present disclosure. The second user equipment 12 includes a processor 121 and a transceiver 123. The processor 121 and the transceiver 123 are coupled through a communication bus 125 allowing the processor 121 to control the transceiver 123 to transmit and/or receive information. FIG. 1E is a block diagram of a base station 13 according to the embodiment of the present disclosure. Base station 13 includes a processor 131 and a transceiver 133. The processor 131 and the transceiver 133 are coupled through a communication bus 135 allowing the processor 131 to control the transceiver 133 to transmit and/or receive information. The interactions between the individual elements will be further described hereinafter.

In some embodiments, the network system 1 may include, for example, a first user equipment 11 and a second user equipment 12 as shown in FIG. 1A. For the second user equipment 12 to perform sidelink communication based on the available resources of the first user equipment 11, the first user equipment 11 must notify the second user equipment 12 of the available resources. In detail, the processor 111 of the first user equipment 11 determines an available sidelink process information 110 instructing transceiver 113 to transmit the available sidelink process information 110 to the second user equipment 12. Subsequently, the transceiver 123 of a second user equipment 12 receives the available sidelink process information 110 from the first user equipment 11, and then the processor 121 of the second user equipment 12 may perform sidelink communication based on available resources of the first user equipment 11 according to the received available sidelink process information 110.

It should also be noted that, in some embodiments, the transmission of the available sidelink process information 110 from the first user equipment 11 to the second user equipment 12 may be triggered by the second user equipment 12. In detail, when the second user equipment 12 needs to perform sidelink communication based on the available resource of the first user equipment 11, the processor 121 of the second user equipment 12 may control the transceiver 123 to transmit an available sidelink process request 120 to the first user equipment 11. Accordingly, the first user equipment 11 may transmits the available sidelink process information 110 to the second user equipment 12 in response to receiving the available sidelink process request 120.

In some embodiments, the network system 1 may include a first user equipment 11, a second user equipment 12 and a base station 13 as shown in FIG. 1B. In these embodiments, the base station 13 may be utilized for scheduling the second user equipment 12 to perform sidelink communication based on resources of the first user equipment 11. In other words, for the second user equipment 12 to perform sidelink communication based on available resources of the first user equipment 11, where the first user equipment 11 informs the base station 13 of the available resources.

In detail, the processor 111 of the first user equipment 11 determines the available sidelink process information 110, and the transceiver 113 of the first user equipment 11 transmits the available sidelink process information 110 to the base station 13. Subsequently, the transceiver 133 of the base station 13 receives the available sidelink process information 110 from the first user equipment 11, and then the processor 131 of the base station 13 may schedule the second user equipment 13 to perform sidelink communication with the first user equipment 11 based on the available resources at the first user equipment 11 according to the available sidelink process information 110 received by the base station 13.

It should be noted that, in some embodiments, the transmission of the available sidelink process information 110 from the first user equipment 11 to the base station 13 may be triggered by the base station 13. In detail, for scheduling the second user equipment 12 to perform sidelink communication based on the available resources at the first user equipment 11, the processor 131 of the base station 13, shown in FIG. 1E, may control the transceiver 133 to transmit an available sidelink process request 130 to the first user equipment 11. Accordingly, the first user equipment 11 may transmits the available sidelink process information 110 to the base station 13 in response to the available sidelink process request 130 being received.

Figure 2A:
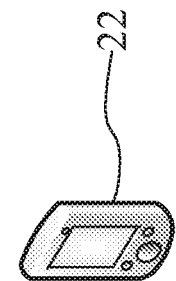
FIG. 2A is a schematic view of a network system according to an embodiment of the present disclosure.
Figure 2A:
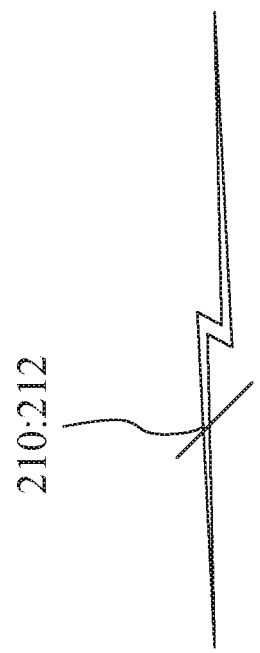
Figure 2A:
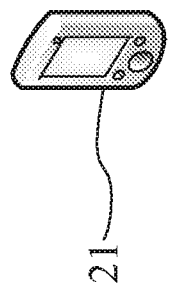
Figure 2B:
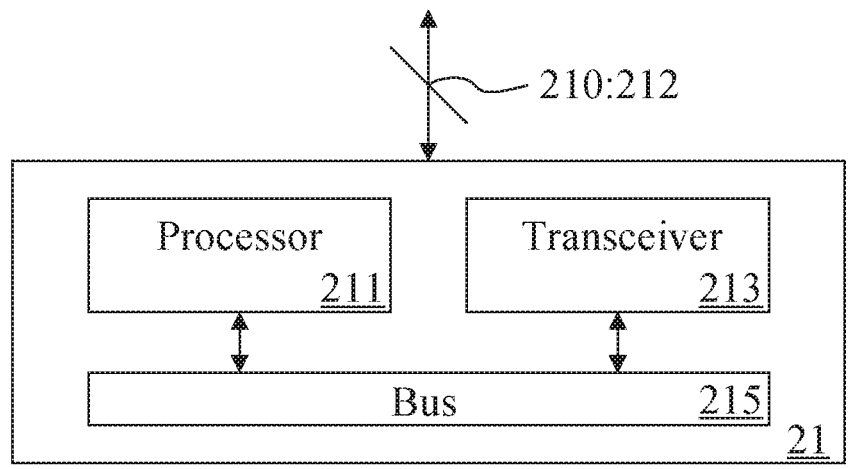
FIG. 2B is a block diagram of a first user equipment according to an embodiment of the present disclosure.
Figure 2C:
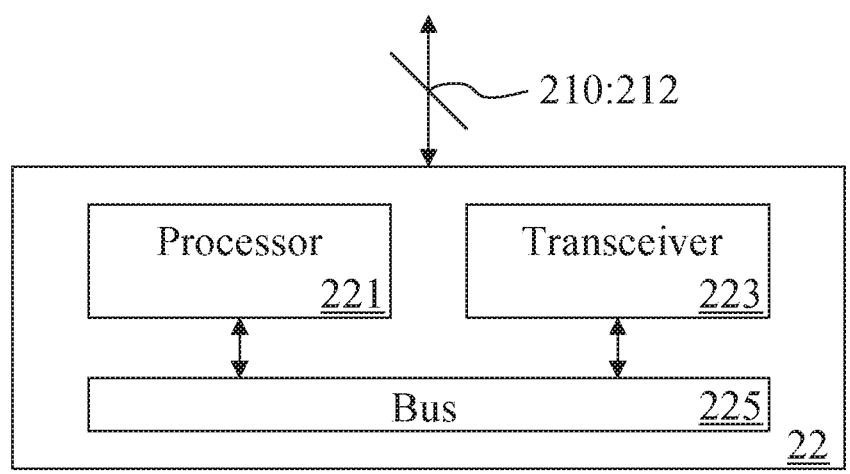
FIG. 2C is a block diagram of a second user equipment according to an embodiment of the present disclosure.

Please refer now to FIG. 2A through FIG. 2C. FIG. 2A is schematic views of a network system 2 according to an embodiment of the present disclosure. The network system 2 includes a first user equipment 21 and a second user equipment 22. FIG. 2B is a block diagram of the first user equipment 21 according to the embodiment of the present disclosure. The first user equipment 21 includes a processor 211 and a transceiver 213. The processor 211 and the transceiver 213 are coupled through a communication bus 215 allowing the processor 211 to control the transceiver 213 to transmit and/or receive information. FIG. 2C is a block diagram of the second user equipment 22 according to the embodiment of the present disclosure. The second user equipment 22 includes a processor 221 and a transceiver 223. The processor 221 and the transceiver 223 are coupled through a communication bus 225 allowing the processor 221 to control the transceiver 223 to transmit and/or receive information. The interactions between the individual elements will be further described hereinafter.

In some embodiments, for the second user equipment 22 to perform sidelink communication based on the resources available at the first user equipment 21, the first user equipment 21 notifies the second user equipment 22 of the available resources directly. In detail, the processor 211 of the first user equipment 21 determines an available sidelink process information 210, and the transceiver 213 of the first user equipment 21 transmits the available sidelink process information 210 to the second user equipment 22. In these embodiments, the available sidelink process information 210 may include, among other things, network parameters for receiving data on sidelink share channel (SL-SCH). The network parameters may include an available sidelink process number 212.

In some embodiments, the available sidelink process number 212 may be a difference between a maximum sidelink process number (not shown and a used sidelink process number (not shown). In detail, the maximum sidelink process number may be a maximum number of processes used by the first user equipment 21 to communicate with other user equipment to receive data on SL-SCH. On the other hand, the used sidelink process number may represent a number of used processes by the first user equipment 21 to communicate with other user equipment to receive data on SL-SCH. Accordingly, the available sidelink process number 212, which is the difference between the maximum sidelink process number and the used sidelink process number, may be an available number of processes for the first user equipment 21 to communicate with additional other user equipment to receive data on SL-SCH.

Further, in some embodiments, the maximum sidelink process number corresponds to a plurality of soft channel bits. In particular, the maximum sidelink process number corresponds to the total number of soft channel bits. The plurality of soft channel bits is part of a soft buffer for receiving data on SL-SCH. The used sidelink process number corresponds to a plurality of used soft channel bits of the plurality of soft channel bits. The plurality of used soft channel bits represents a used part of the soft buffer. The available sidelink process number 212 corresponds to a plurality of available soft channel bits of the plurality of soft channel bits. The plurality of available soft channel bits is an available part of the soft buffer. Accordingly, the plurality of available soft channel bits is a difference between the plurality of used soft channel bits and the total number of soft channel bits.

For example, in 3GPP, when a maximum number of SL-SCH transport block bits transmitted within a Transmission Time Interval (TTI) is designated to 31704, each process will be allocated with soft channel bits 31704*3 under ⅓ code rate. Therefore, maximum sidelink process number of the present disclosure equals to a value of dividing total number of soft channel bits by 31704*3. In some cases, when the total number of soft channel bits is 760896, the maximum sidelink process number is 760896/(31704*3)=8. Accordingly, when the used sidelink process number is 1 which corresponds to 31704*3 allocated/occupied soft channel bits, the available sidelink process number is 8−1=7 which corresponds to 31704*3*7 unused soft channel bits.

On the other hand, the transceiver 223 of the second user equipment 22 receives the available sidelink process information 210 with the available sidelink process number 212 from the first user equipment 21, and then, processor 221 of the second user equipment 22 may perform sidelink communication based on the available processes of the first user equipment 11 for receiving data on SL-SCH.

For example, while the first user equipment 21 supports 8 sidelink processes for receiving data on SL-SCH under vehicle-to-everything (V2X) architecture of New Radio (NR) network and there is another user equipment connected with the first user equipment 21 that already uses 3 sidelink processes, it represents that the maximum sidelink process number of the first user equipment 21 is 8 and the used sidelink process number of the first user equipment 21 is 3.

Accordingly, the processor 211 of the first user equipment 21 can determine the available sidelink process number 212 to be 5 which represents a difference between 8 and 3. Then, transceiver 213 of the first user equipment 21 transmits the available sidelink process number 212 to the second user equipment 22 notifying the second user equipment 22 that the first user equipment 21 has 5 available sidelink processes for receiving data on SL-SCH.

In some embodiments, the available sidelink process information 210 may be determined based on a default configuration (not shown). In these embodiments, the available sidelink process information 210 may include network parameters used for receiving data on SL-SCH. In particular, the network parameters may include the available sidelink process number 212. The default configuration may also be initially stored in the first user equipment 21 and used to configure the available sidelink process number 212. In detail, the default configuration may include a first fixed sidelink process number (not shown) for each connection between the first user equipment 21 and another user equipment. In some embodiments, the default configuration may be determined by a base station and transmitted from the base station.

Therefore, when the processor 211 of the first user equipment 21 determines the available sidelink process number 212 for establishing a sidelink communication connection with the second user equipment 22, the available sidelink process number 212 could be further determined as the first fixed sidelink process number at most. In other words, the first fixed sidelink process number represents a ceiling of the available sidelink process number 212 for each sidelink communication connection. Accordingly, the second user equipment 22 establishes a sidelink communication connection with the first user equipment 21 using the first fixed sidelink process number as the available sidelink processes at most.

For example, the default configuration includes a first fixed sidelink process number set to 2, which represents that the ceiling or maximum process number for each sidelink communication connection between the first user equipment 21 and another user equipment is 2. Accordingly, the processor 211 of the first user equipment 21 may determine that the available sidelink process number 212 could be set to 2 at most.

In some cases, when the actual number of the available sidelink processes of the first user equipment 21 is set to 4, the processor 211 determines that the available sidelink process number 212 is 2 based on the first fixed sidelink process number which is the ceiling of the available sidelink process number 212. Then, the transceiver 213 of the first user equipment 21 transmits the available sidelink process number 212 to the second user equipment 22 to notify the second user equipment 22 that the first user equipment 21 has 2 available sidelink processes for receiving data on SL-SCH.

In some cases, when the actual number of the available sidelink processes of the first user equipment 21 is 1 which is less than the first fixed sidelink process number, the processor 211 determines that the available sidelink process number 212 is 1. Then, the transceiver 213 of the first user equipment 21 transmits the available sidelink process number 212 to the second user equipment 22 to notify the second user equipment 22 that the first user equipment 21 has 1 available sidelink processes for receiving data on SL-SCH.

In some embodiments, the default configuration may include multiple fixed sidelink process numbers for multiple connections between the first user equipment 21 and other user equipment. For one example, the default configuration may include two fixed sidelink process numbers set to 2 and 4. The fixed sidelink process number set to 2 may be designated to a connection between the first user equipment 21 and a third user equipment. The fixed sidelink process number set to 4 may be designated to a connection between the first user equipment 21 and a fourth user equipment. For another example, the default configuration may include two fixed sidelink process numbers set to 3 and 5. The fixed sidelink process number set to 3 may be designated to a connection of unicast between the first user equipment 21 and a fifth user equipment. The fixed sidelink process number set to 5 may be designated to connections of groupcast between the first user equipment 21 and a plurality of sixth user equipment.

It should be noted that the available resources available to the user equipment mentioned in the above embodiments may be unused part of soft buffer of the user equipment for receiving data on sidelink. The available sidelink process number 212 may be used for notifying another user equipment of available processes, which corresponds to the unused part of soft buffer, for receiving data on sidelink. In some embodiments, the available sidelink process information 210 with the available sidelink process number 212 may be independently transmitted. In some embodiments, the available sidelink process information 210 with the available sidelink process number 212 may be included in some existed information, such as User Equipment Capability Information (UE Capability Information) which is a Radio Resource Control (RRC) signaling.

Figure 3B:
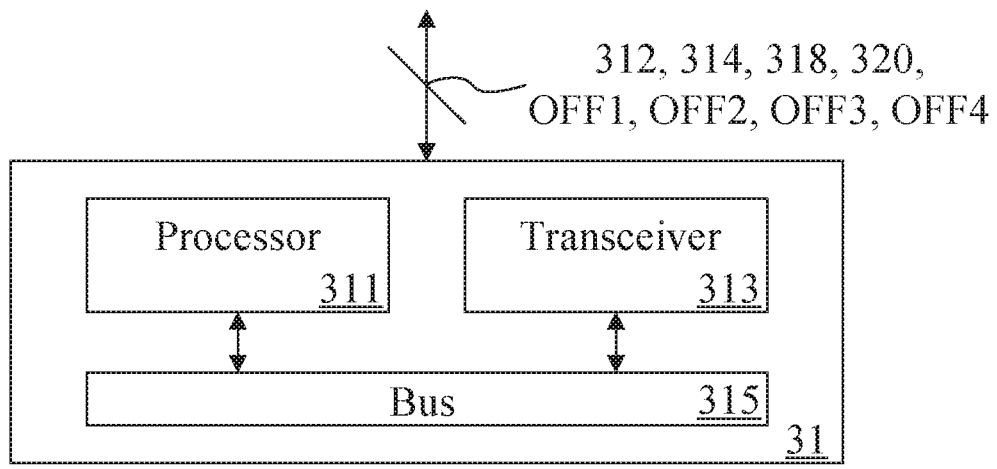
FIG. 3B is a block diagram of a first user equipment according to an embodiment of the present disclosure.
Figure 3C:
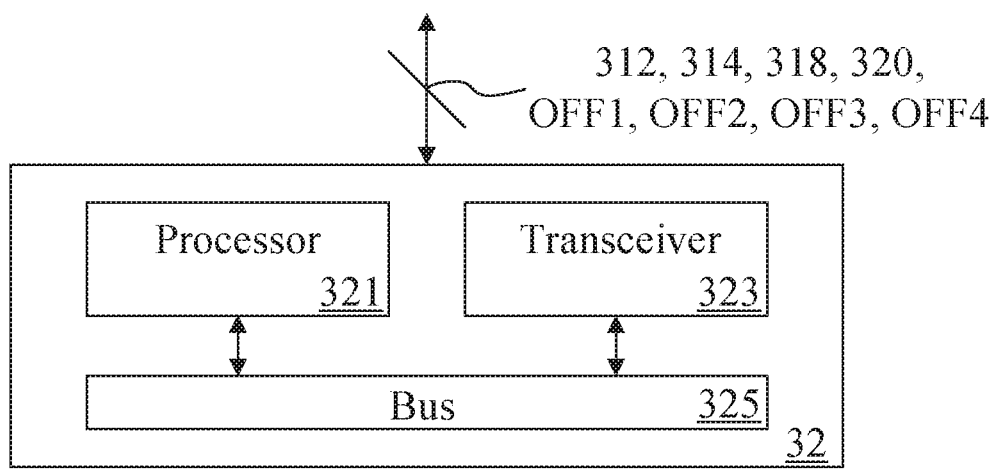
FIG. 3C is a block diagram of a second user equipment according to an embodiment of the present disclosure.

Please refer to FIGS. 3A to FIG. 3C. FIG. 3A is a schematic view of a network system 3 according to an embodiment of the present disclosure. The network system 3 includes a first user equipment 31 and a second user equipment 32. FIG. 3B is a block diagram of the first user equipment 31 according to the embodiment of the present disclosure. The first user equipment 31 includes a processor 311 and a transceiver 313. The processor 311 and the transceiver 313 are coupled through a communication bus 315 allowing the processor 311 to control the transceiver 313 to transmit/receive information. FIG. 3C is a block diagram of the second user equipment 32 according to the embodiment of the present disclosure. The second user equipment 32 includes a processor 321 and a transceiver 323. The processor 321 and the transceiver 323 are coupled through a communication bus 325 allowing the processor 321 to control the transceiver 323 to transmit/receive information. The interactions between the individual elements will be further described hereinafter.

In some embodiments, before establishing sidelink communication connection with the first user equipment 31, the second user equipment 32 may inform the first user equipment 31 of a required sidelink process information to be used for receiving data on SL-SCH. The required sidelink process information may include a number of required sidelink processes. In detail, the processor 321 of the second user equipment 32 determines required sidelink process number 320 for establishing sidelink communication connection with the first user equipment 31. Then, the transceiver 323 of the second user equipment 32 transmits the required sidelink process number 320 to the first user equipment 31.

On the other hand, after the transceiver 313 of the first user equipment 31 receives the required sidelink process number 320, the processor 311 of the first user equipment 31 determines an available sidelink process number 312. Next, the processor 311 of the first user equipment 31 determines whether the required sidelink process number 320 is greater than the available sidelink process number 312.

In some embodiments, the processor 311 of the first user equipment 31 determines that the required sidelink process number 320 is not greater than the available sidelink process number 312. Therefore, the transceiver 313 of the first user equipment 31 transmits the available sidelink process number 312 for establishing sidelink communication connection with the second user equipment 31 based on the required sidelink process number 320.

For example, while the required sidelink process number 320 is set to 3 and the available sidelink process number 312 is determined to be 5, the processor 311 of the first user equipment 31 determines that the required sidelink process number 320 is not greater than the available sidelink process number 312. Therefore, the transceiver 313 of the first user equipment 31 transmits the available sidelink process number 312 for establishing sidelink communication connection with the second user equipment 31 with 3 sidelink processes.

In some embodiments, the processor 311 of the first user equipment 31 determines that the required sidelink process number 320 is greater than the available sidelink process number 312. Therefore, the transceiver 313 of the first user equipment 31 transmits the available sidelink process number 312 for establishing sidelink communication connection with the second user equipment 31 based on the available sidelink process number 312.

For example, while the required sidelink process number 320 is set to 4 and the available sidelink process number 312 is determined to be 3, the processor 311 of the first user equipment 31 determines that the required sidelink process number 320 is greater than the available sidelink process number 312. Therefore, the transceiver 313 of the first user equipment 31 transmits the available sidelink process number 312 for establishing sidelink communication connection with the second user equipment 31 indicating 3 sidelink processes, by setting the available sidelink process number 312 to 3.

In some embodiments, the processor 311 of the first user equipment 31 determines that the required sidelink process number 320 is greater than the available sidelink process number 312. Therefore, the transceiver 313 of the first user equipment 31 transmits a rejection signal 318 to the second user equipment 32 rejecting the establishment of sidelink communication connection.

For example, while the required sidelink process number 320 is set to 3 and the available sidelink process number 312 is determined to be 0, the processor 311 of the first user equipment 31 determines that the required sidelink process number 320 is greater than the available sidelink process number 312. Therefore, the transceiver 313 of the first user equipment 31 transmits a rejection signal 318 to the second user equipment 32 rejecting the establishment of sidelink communication connection.

In some embodiments, the processor 311 of the first user equipment 31 determines that the required sidelink process number 320 is greater than the available sidelink process number 312. Therefore, the transceiver 313 of the first user equipment 31 transmits an unavailable sidelink process number 314 to the second user equipment 32 for informing the second user equipment 32 of the insufficient sidelink processes.

For example, while the required sidelink process number 320 is set to 3 and the available sidelink process number 312 is determined to be 1, the processor 311 of the first user equipment 31 determines that the required sidelink process number 320 is greater than the available sidelink process number 312. Therefore, the transceiver 313 of the first user equipment 31 transmits the unavailable sidelink process number 314, which may be a difference between the required sidelink process number 320 and the available sidelink process number 312, to the second user equipment 32 for informing the second user equipment 32 of the insufficient sidelink processes.

In some embodiments, the available sidelink processes of the first user equipment 31 may be increased due to the sidelink communication disconnection from other user equipment. Accordingly, the first user equipment 31 may notify the second user equipment 32 of the increase of the available sidelink processes for receiving data on SL-SCH. In detail, when the first user equipment 31 disconnects the sidelink communication from another user equipment, the sidelink processes used to communicate with another user equipment may be released and become available again. Therefore, the processor 311 of the first user equipment 31 determines a first offset OFF1 of the available sidelink process number 312 based on the released used sidelink processes. Then, the transceiver 313 of the first user equipment 31 transmits the first offset OFF1 to the second user equipment 32 for notifying the second user equipment 32 of the increase in the available sidelink processes.

For example, when the first user equipment 31 disconnects the sidelink communication to another user equipment, there may be, for example, 3 released sidelink processes and the released sidelink processes become the available sidelink processes. Therefore, the processor 311 of the first user equipment 31 determines that the first offset OFF1 of the available sidelink process number 312 is 3, and the transceiver 313 of the first user equipment 31 transmits the first offset OFF1 to the second user equipment 32 for notifying the second user equipment 32 of the 3 newly available sidelink processes.

In some embodiments, the available sidelink processes of the first user equipment 31 may be decreased due to the establishment of sidelink communication connection with other user equipment. Accordingly, the first user equipment 31 may notify the second user equipment 32 of the decrease in the available sidelink processes for receiving data on SL-SCH. In detail, when the first user equipment 31 connects with another user equipment, some available sidelink processes may be consumed and become used sidelink processes. Therefore, the processor 311 of the first user equipment 31 determines a second offset OFF2 of the available sidelink process number 312 based on the consumed available sidelink processes. Then, the transceiver 313 of the first user equipment 31 transmits the second offset OFF2 to the second user equipment 32 notifying the second user equipment 32 of the decrease in the available sidelink processes. In other words, the first offset OFF1 or the second offset OFF2 may be a variable of the available sidelink process number 312.

For example, when the first user equipment 31 connects the sidelink communication with another user equipment and uses 2 available sidelink processes, the processor 311 of the first user equipment 31 determines that the second offset OFF2 of the available sidelink process number 312 is −2, and the transceiver 313 of the first user equipment 31 transmits the second offset to the second user equipment 32 for notifying the second user equipment 32 of the 2 fewer available sidelink processes.

In some embodiments, the required sidelink processes of the second user equipment 32 may be increased. Accordingly, the second user equipment 32 may notify the first user equipment 31 of the increase of the required sidelink processes for receiving data on SL-SCH. In detail, the processor 321 of the second user equipment 32 determines a third offset OFF3 of the required sidelink process number 320. Then, the transceiver 323 of the second user equipment 32 transmits the third offset OFF3 to the first user equipment 31 for notifying the first user equipment 31 of the increase in the required sidelink processes.

For example, when the second user equipment 32 needs one more sidelink process for communication with the first user equipment 31, the processor 321 of the second user equipment 32 determines that the third offset OFF3 of the required sidelink process number 320 is 1, and the transceiver 323 of the second user equipment 32 transmits the third offset OFF3 to the first user equipment 31 for notifying the first user equipment 31 of the increased in required sidelink processes by 1 process.

In some embodiments, the number of required sidelink processes by the second user equipment 32 may be decreased. Accordingly, the second user equipment 32 may notify the first user equipment 31 of the decrease in the required number of sidelink processes for receiving data on SL-SCH. In detail, the processor 321 of the second user equipment 32 determines a fourth offset OFF4 in the required sidelink process number 320. Then, the transceiver 323 of the second user equipment 32 transmits the fourth offset OFF4 to the first user equipment 31 for notifying the first user equipment 31 of the decrease in the number of required sidelink processes. In other words, the third offset OFF3 or the fourth offset OFF4 may be a variable of the required sidelink process number 320.

For example, when the second user equipment 32 needs to release one side link process when communicating with the first user equipment 31, the processor 321 of the second user equipment 32 determines that the fourth offset OFF4 of the required sidelink process number 320 is −1, and the transceiver 323 of the second user equipment 32 transmits the fourth offset OFF4 to the first user equipment 31 for notifying the first user equipment 31 of the decreased in required number of sidelink processes by 1 process.

In some embodiments, when the second user equipment 32 establishes the sidelink communication with multiple first user equipment 31 in a groupcast situation, the processor 321 of the second user equipment 32 may determine total number of sidelink transmission processes based on the reported sidelink processes of the multiple first user equipment 31. Further, the transceiver 323 of the second user equipment 32 may transmit a message (not shown) to request one of the multiple first user equipment 31 to release used sidelink processes.

In some embodiments, the required sidelink process number 320 may be determined based on a default configuration (not shown). In these embodiments, the default configuration may be initially stored in the second user equipment 32 and used for configuring the required sidelink process number 320. In detail, the default configuration may include a second fixed sidelink process number (not shown) for each connection between the second user equipment 32 and another user equipment. In some embodiments, the default configuration may be determined by a base station and transmitted from the base station.

Figure 4A:
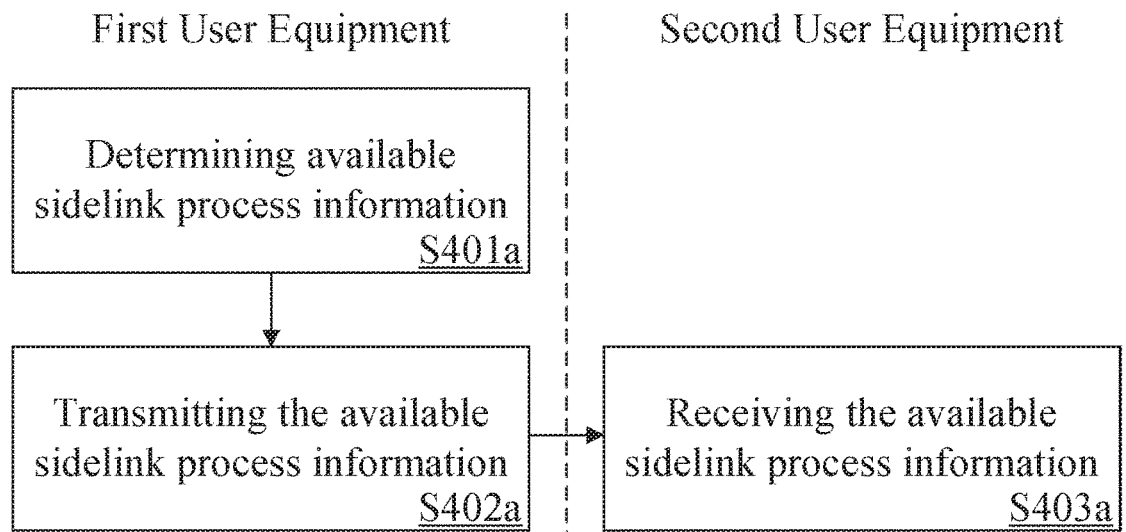
FIGS. 4A and 4B are flowchart diagrams according to embodiments of the present disclosure.

Some embodiments of the present disclosure include a method, and a flowchart diagram thereof is shown in FIG. 4A. The method of some embodiments is for use in a network system (e.g., the network system of the aforesaid embodiments), wherein the network system includes a first user equipment and a second user equipment (e.g., the user equipment of the aforesaid embodiments). Detailed operations of the method are described below.

For the second user equipment to perform sidelink communication based on the resources of the first user equipment, the first user equipment may notify the second user equipment of some available resources. Operation S401a is executed to determine, by the first user equipment, an available sidelink process information. Operation S402a is executed to transmit, by the first user equipment, the available sidelink process information to the second user equipment. Operation S403a is executed to receive, by the second user equipment, the available sidelink process information from the first user equipment. Accordingly, the second user equipment may perform sidelink communication based on available resources of the first user equipment according to the available sidelink process information.

Figure 4B:
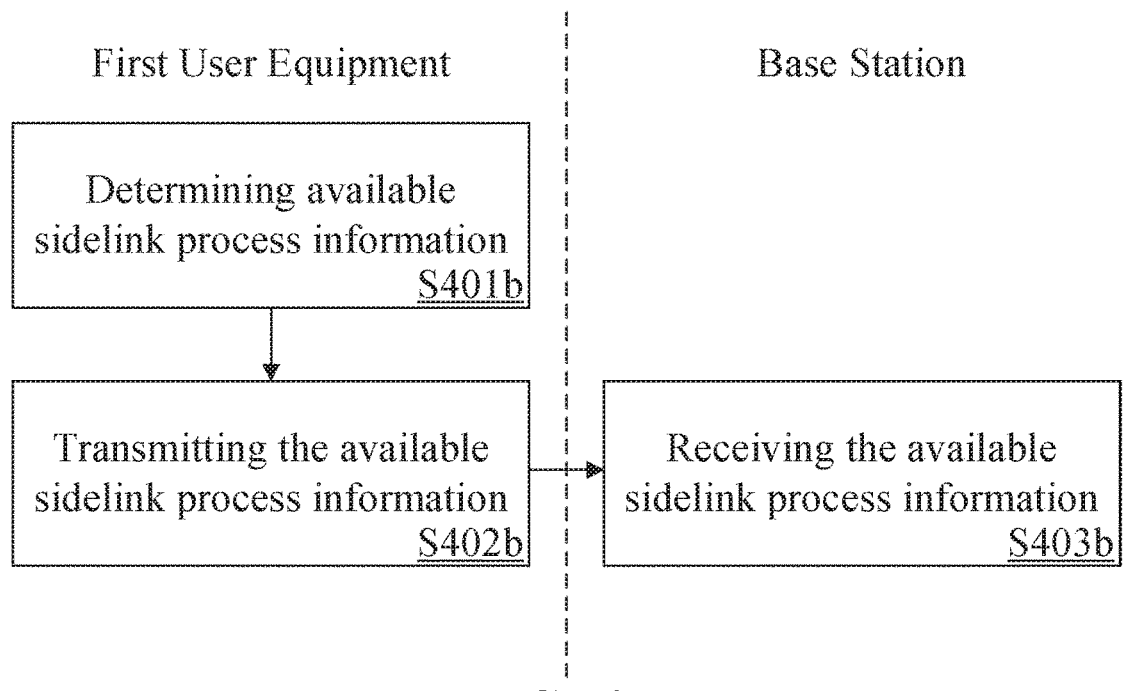

It should be noted that, in some embodiments, a base station may be introduced for scheduling the second user equipment to perform sidelink communication based on resources of the first user equipment. A flowchart diagram thereof is shown in FIG. 4B.

Operation S401b is executed to determine, by the first user equipment, an available sidelink process information. Operation S402b is executed to transmit, by the first user equipment, the available sidelink process information to the base station. Operation S403b is executed to receive, by the base station, the available sidelink process information from the first user equipment. Accordingly, the base station may schedule the second user equipment to perform sidelink communication based on the available resources of the first user equipment according to the available sidelink process information.

Figure 5A:
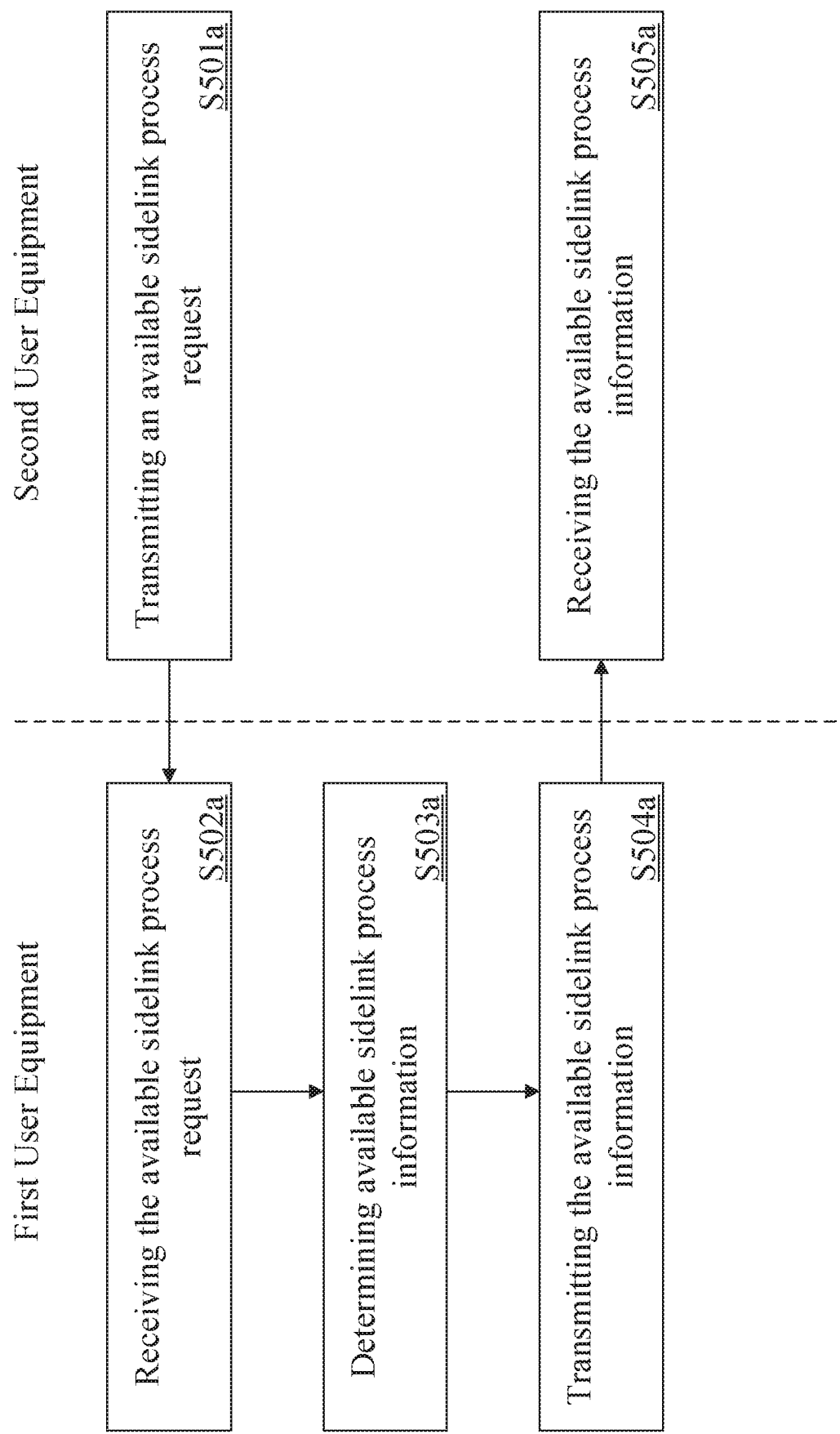
FIGS. 5A and 5B are flowchart diagrams according to embodiments of the present disclosure.

Some embodiments of the present disclosure include a method, and a flowchart diagram thereof is shown in FIG. 5A. The method of some embodiments is for use in a network system (e.g., the network system of the aforesaid embodiments), wherein the network system includes a first user equipment and a second user equipment (e.g., the user equipment of the aforesaid embodiments). Detailed operations of the method are described below.

In some embodiments, when the second user equipment needs to perform sidelink communication based on the available resource (e.g., unused part of soft buffer for receiving data of sidelink) of the first user equipment, the second user equipment may trigger the information exchange. Operation S501a is executed to transmit, by the second user equipment, an available sidelink process request to the first user equipment. Operation S502a is executed to receive, by the first user equipment, the available sidelink process request from the second user equipment.

Operation S503a is executed to determine, by the first user equipment, an available sidelink process information. Operation S504a is executed to transmit, by the first user equipment, the available sidelink process information to the second user equipment in response to the available sidelink process request. Operation S505a is executed to receive, by the second user equipment, the available sidelink process information from the first user equipment. Accordingly, the second user equipment may perform sidelink communication based on the available resources of the first user equipment according to the available sidelink process information.

Figure 5B:
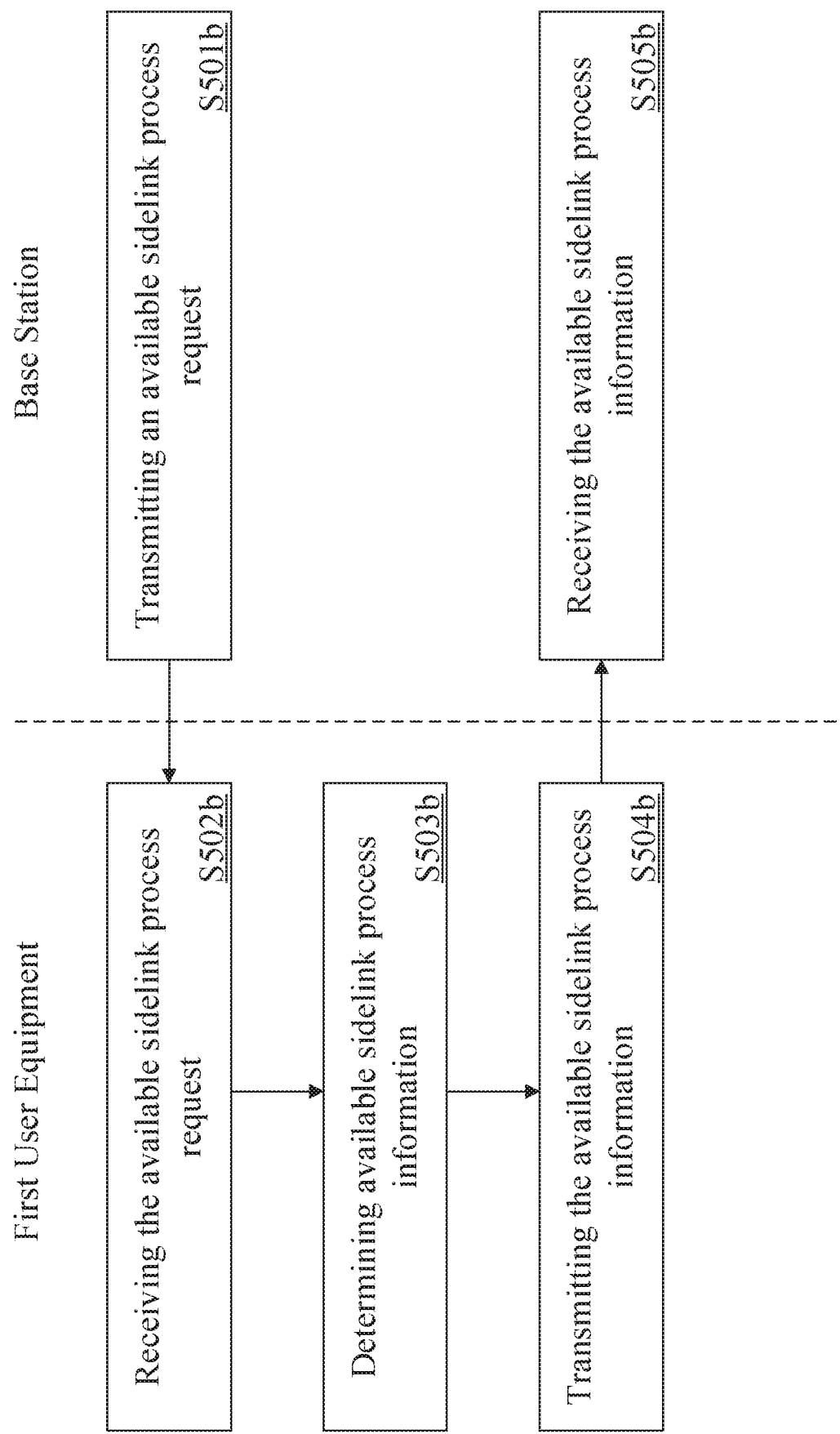

It should be noted that, in some embodiments, a base station may be introduced for scheduling the second user equipment to perform sidelink communication based on the resources of the first user equipment, and the transmission of the available sidelink process information may be triggered by the base station. A flowchart diagram thereof is shown in FIG. 5B.

Operation S501b is executed to transmit, by the base station, an available sidelink process request to the first user equipment. Operation S502b is executed to receive, by the first user equipment, the available sidelink process request from the base station.

Operation S503b is executed to determine, by the first user equipment, an available sidelink process information. Operation S504b is executed to transmit, by the first user equipment, the available sidelink process information to the base station in response to the available sidelink process request. Operation S505b is executed to receive, by the base station, the available sidelink process information from the first user equipment. Accordingly, the base station may schedule the second user equipment to perform sidelink communication based on the available resources of the first user equipment according to the available sidelink process information.

Figure 6:
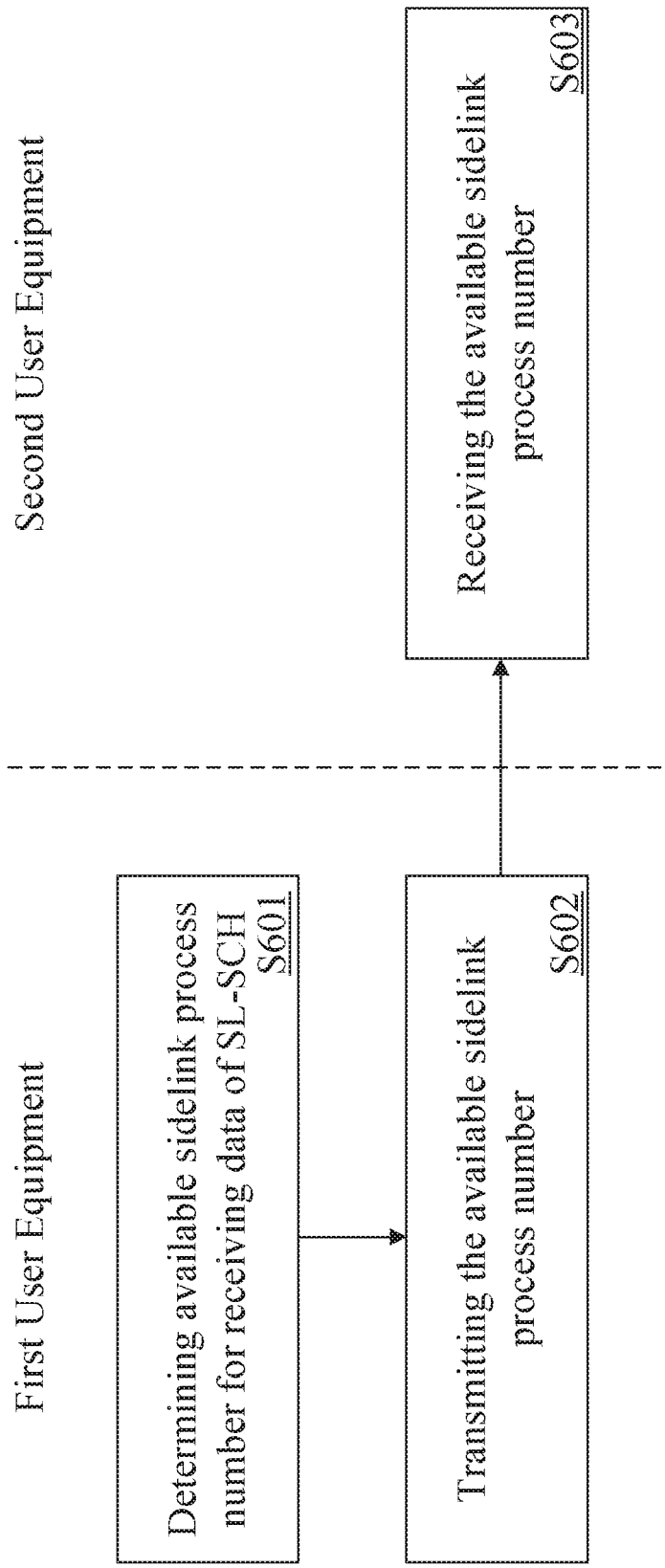
FIG. 6 is a flowchart diagrams according to an embodiment of the present disclosure.

Some embodiments of the present disclosure include a method, and a flowchart diagram thereof is shown in FIG. 6. The method of some embodiments is for use in a network system (e.g., the network system of the aforesaid embodiments), wherein the network system includes a first user equipment and a second user equipment (e.g., the user equipment of the aforesaid embodiments). Detailed operations of the method are described below.

In some embodiments, for the second user equipment to perform sidelink communication based on the resources of the first user equipment, the first user equipment may notify the second user equipment of some available resources. Operation S601 is executed to determine, by the first user equipment, an available sidelink process information. In these embodiments, the available sidelink process information may include network parameters for receiving data on SL-SCH. The network parameters may include, among other things, an available sidelink process number.

In some embodiments, the available sidelink process number may be a difference between a maximum sidelink process number and a used sidelink process number. Further, the maximum sidelink process number may be a maximum number of processes for the first user equipment to communicate with other user equipment for receiving data on SL-SCH. The used sidelink process number may represent a used number of processes for the first user equipment to communicate with other user equipment for receiving data on SL-SCH. Accordingly, the available sidelink process number, which is the difference between the maximum sidelink process number and the used sidelink process number, may be an available number of processes for the first user equipment to communicate with other user equipment for receiving data of SL-SCH.

Further, in some embodiments, the maximum sidelink process number corresponds to a plurality of soft channel bits. The plurality of soft channel bits is a soft buffer for receiving data of SL-SCH. The used sidelink process number corresponds to a plurality of used soft channel bits of the plurality of soft channel bits. The plurality of used soft channel bits is the used part of the soft buffer. The available sidelink process number corresponds to a plurality of available soft channel bits of the plurality of soft channel bits. The plurality of available soft channel bits is the available part of the soft buffer. Accordingly, the plurality of available soft channel bits is a difference between the plurality of used soft channel bits and the plurality of soft channel bits.

In some embodiments, the available sidelink process information may be determined based on a default configuration which may be used for configuring the available sidelink process number. In detail, the default configuration may include a fixed sidelink process number for each communication connection between the first user equipment and another user equipment. In some embodiments, the default configuration may be initially stored in the first user equipment, or may be determined by a base station and transmitted from the base station.

Operation S602, in FIG. 6, is executed to transmit, by the first user equipment, the available sidelink process number to the second user equipment. Operation S603 is executed to receive, by the second user equipment, the available sidelink process number from the first user equipment. Accordingly, the second user equipment may perform sidelink communication based on the available sidelink processes of the first user equipment for receiving data on SL-SCH.

Some embodiments of the present disclosure include a method, and flowchart diagrams thereof are shown in FIGS. 7A to 7D. The method of some embodiments is for use in a network system (e.g., the network system of the aforesaid embodiments), wherein the network system includes a first user equipment and a second user equipment (e.g., the user equipment of the aforesaid embodiments). Detailed operations of the method are described below.

In some embodiments, before establishing sidelink communication connection with the first user equipment, the second user equipment may inform the first user equipment of a required sidelink process information for receiving data on SL-SCH. The required sidelink process information may include a number of required sidelink process. In detail, operation S701 is executed to determine, by the second user equipment, a required sidelink process information. The required sidelink process information includes a required sidelink process number. Operation S702 is executed to transmit, by the second user equipment, the required sidelink process number to the first user equipment. Operation S703 is executed to receive, by the first user equipment, the required sidelink process number from the second user equipment.

In some embodiments, the required sidelink process information may be determined based on a default configuration which may be used for configuring the required sidelink process number. In detail, the default configuration may include a fixed sidelink process number for each communication connection between the second user equipment and another user equipment. In some embodiments, the default configuration may be initially stored in the second user equipment, or may be determined by a base station and transmitted from the base station.

On the other hand, for the other user equipment to perform sidelink communication based on the available resource of the first user equipment, operation S704 is executed to determine, by the first user equipment, an available sidelink process information which may include an available sidelink process number for receiving data on SL-SCH. It should be noted that, in some embodiments, operation S704 may be executed: (1) before operations S701 to S703; (2) after operation S701 to S703; or (3) in parallel with operation S701 to S703. Operation S705 is executed to determine, by the first user equipment, whether the required sidelink process number is greater than the available sidelink process number.

Figure 7A:
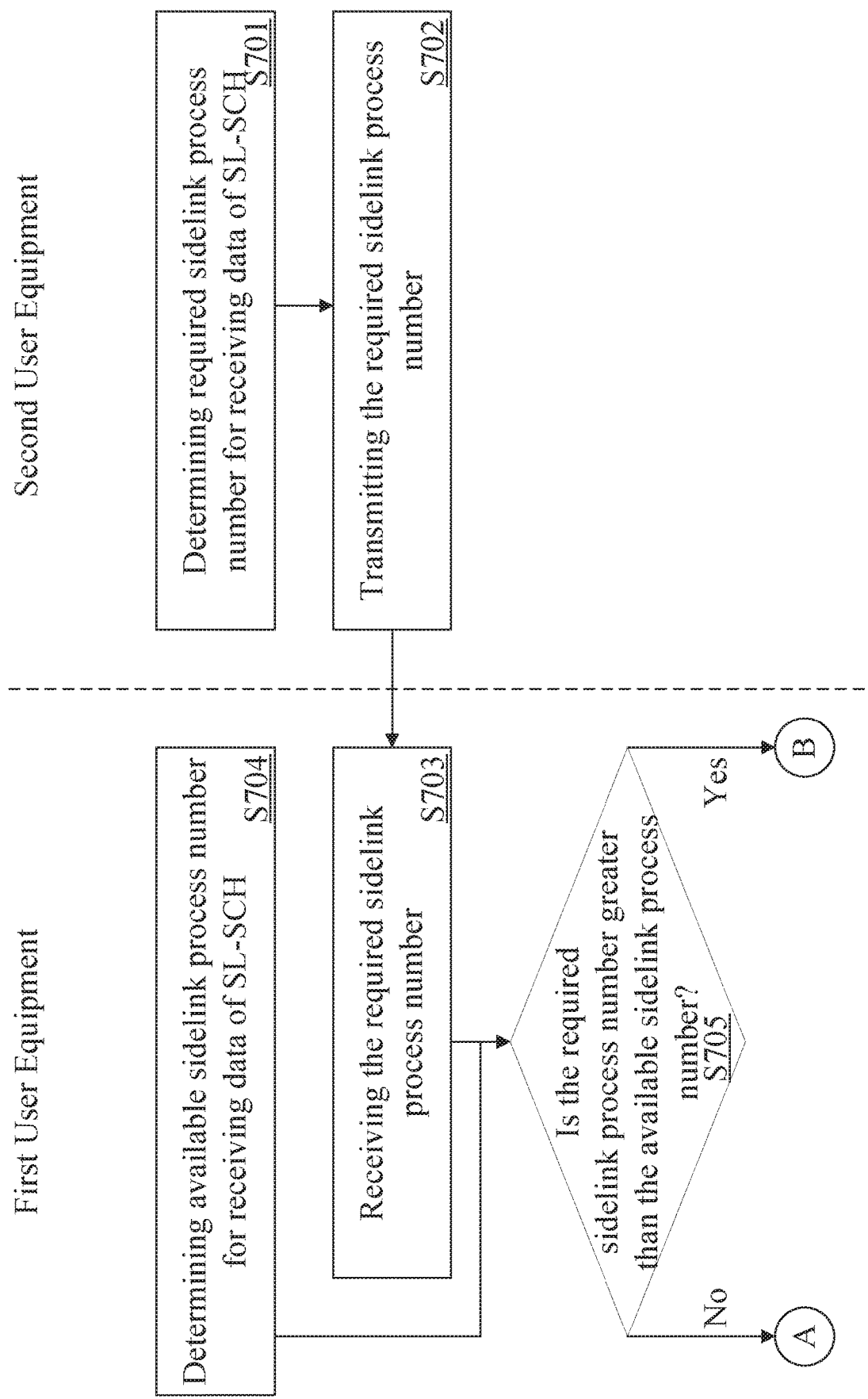
Figure 7B:
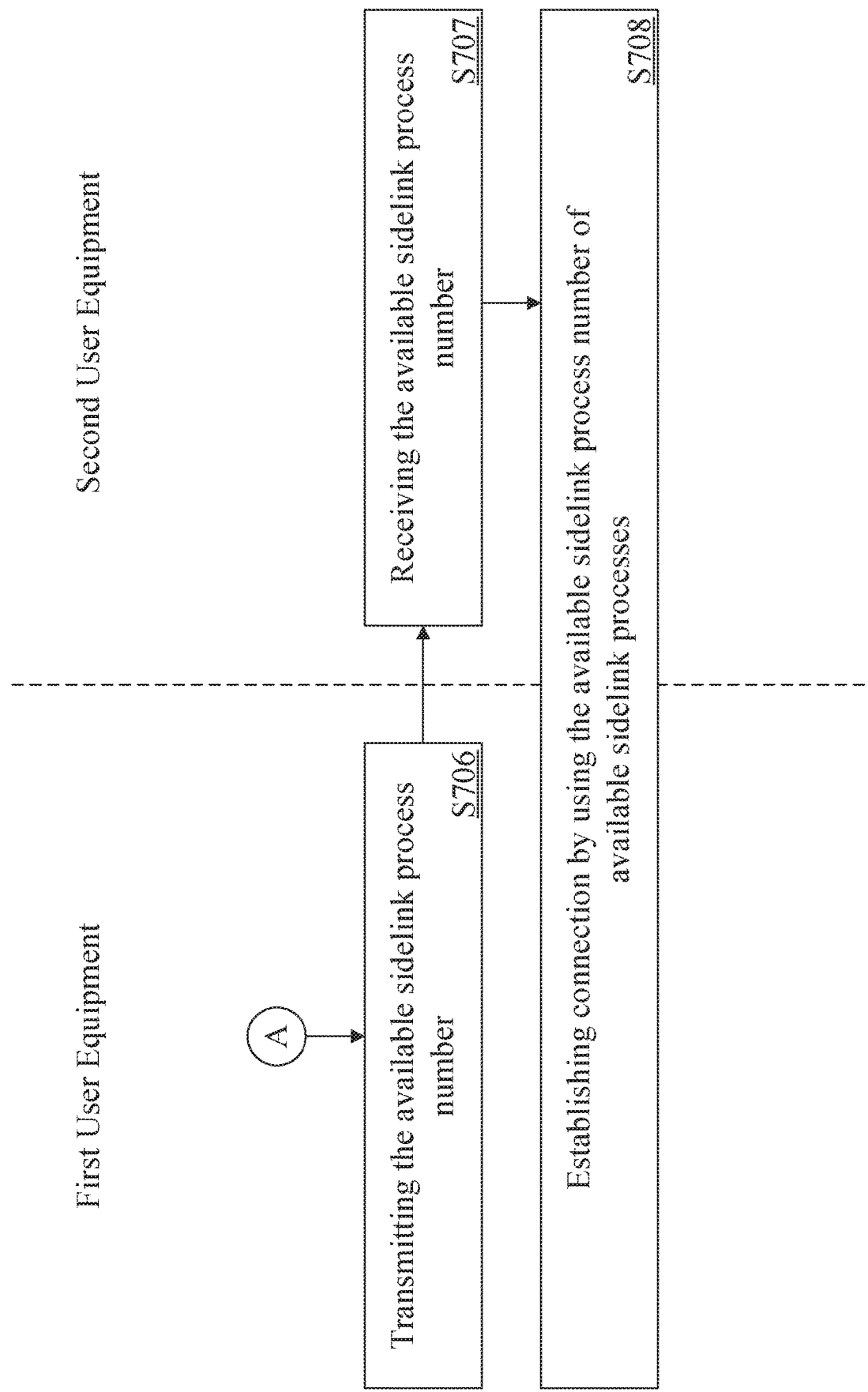

Please refer to FIG. 7B. When the required sidelink process number is not greater than the available sidelink process number, operation S706 is executed to transmit, by the first user equipment, the available sidelink process number to the second user equipment. Operation S707 is executed to receive, by the second user equipment, the available sidelink process number from the first user equipment. Operation S708 is executed to establish, by the first user equipment and the second user equipment, a sidelink communication connection using the available sidelink process number of available sidelink processes.

When the required sidelink process number is greater than the available sidelink process number, at least two implementations may be introduced. Referring to FIG. 7C for the first implementation, operation S709 is executed to transmit, by the first user equipment, a rejection signal or an unavailable sidelink process number to the second user equipment for rejecting the establishment of a sidelink communication connection or for informing the second user equipment of the shortage of sidelink processes. Operation S710 is executed to receive, by the second user equipment, the rejection signal or the unavailable sidelink process number from the first user equipment.

Referring to FIG. 7D for the second implementation, if the available sidelink process number is greater than zero, operation S711 is executed to transmit, by the first user equipment, the available sidelink process number to the second user equipment. Operation S712 is executed to receive, by the second user equipment, the available sidelink process number from the first user equipment. S713 is executed to establish, by the first user equipment and the second user equipment, a sidelink communication connection using the rest of available sidelink processes.

Figure 8A:
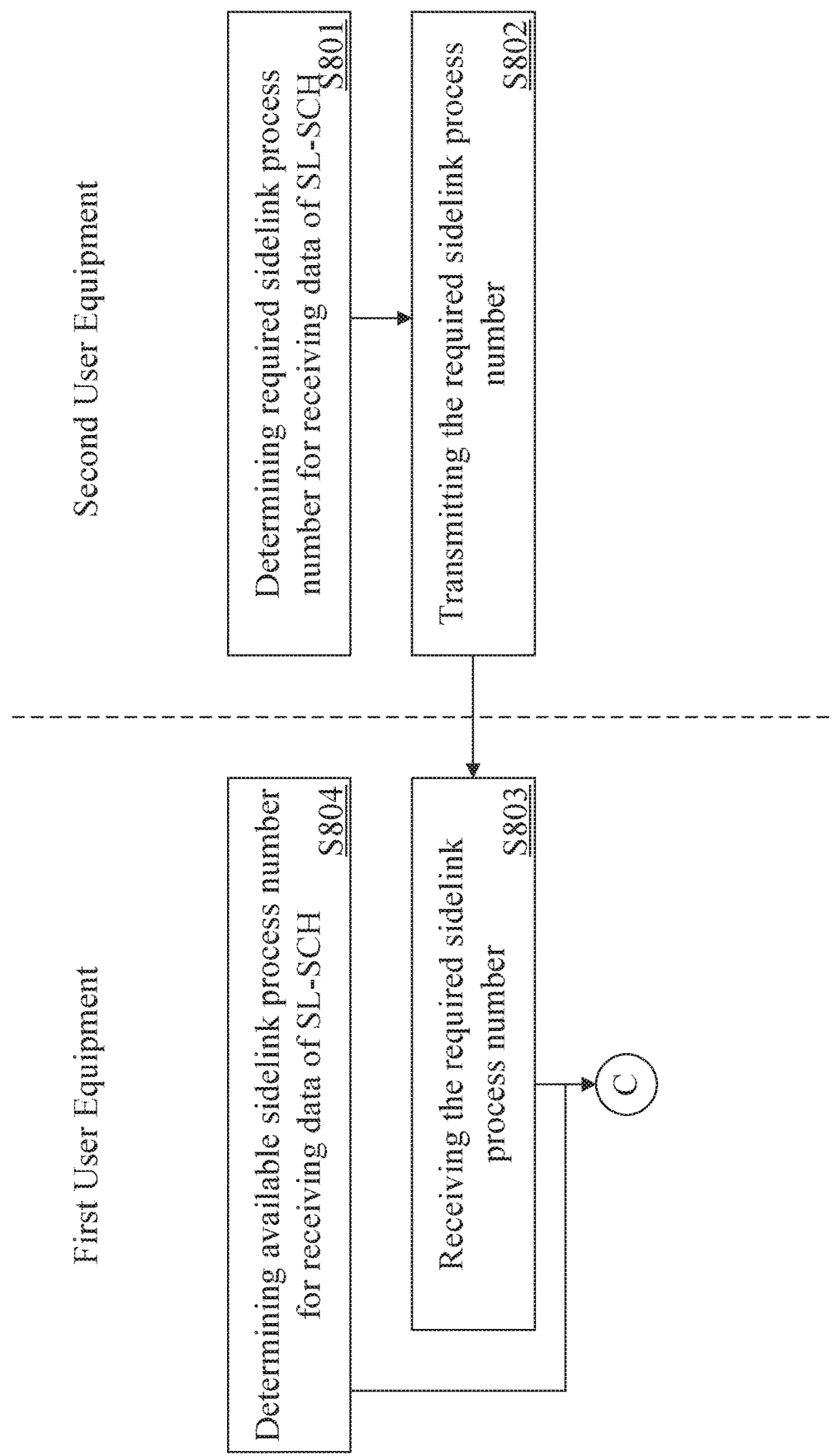
FIGS. 8A to 8C are flowchart diagrams according to embodiments of the present disclosure.
Figure 8B:
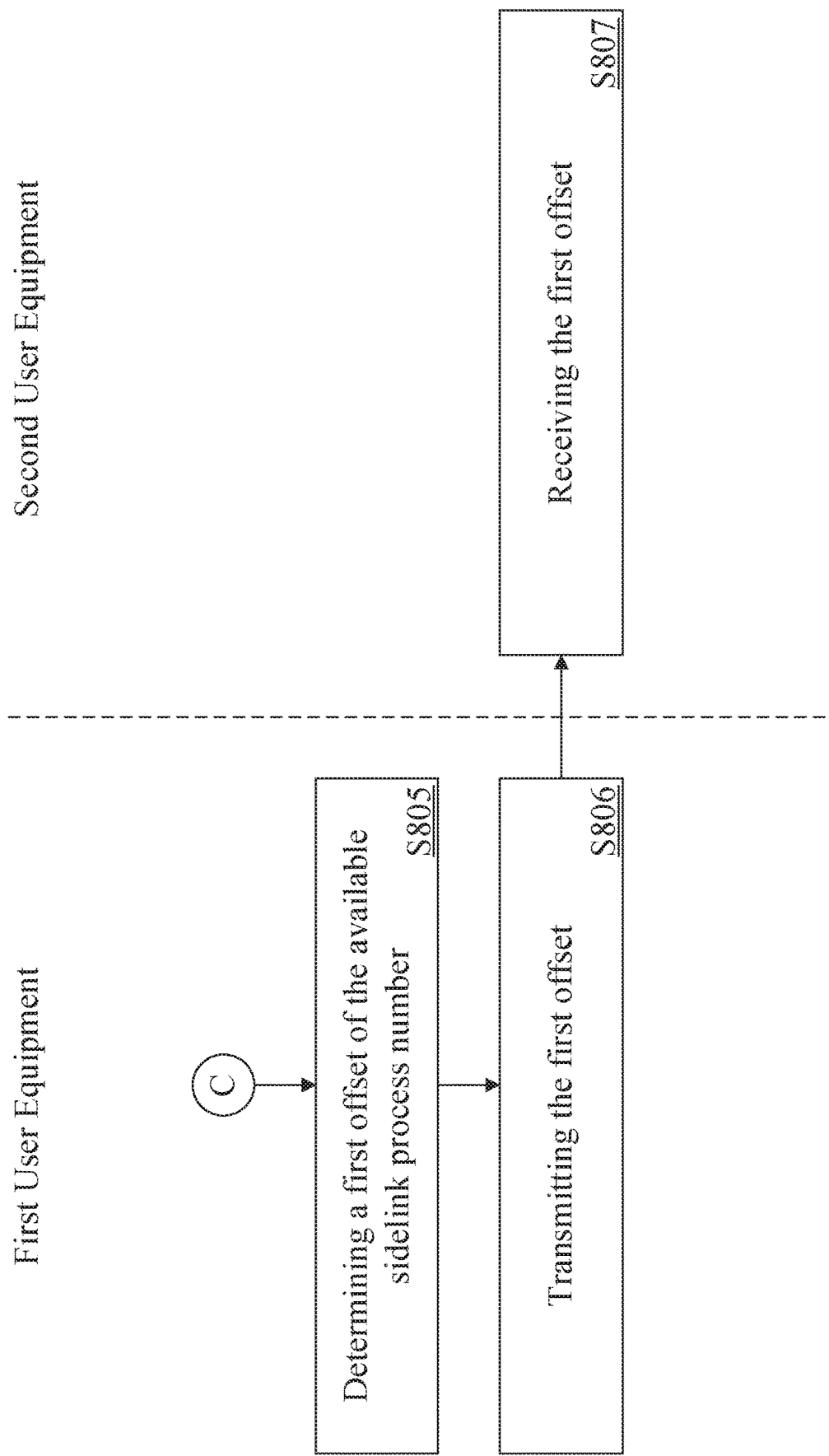
Figure 8C:
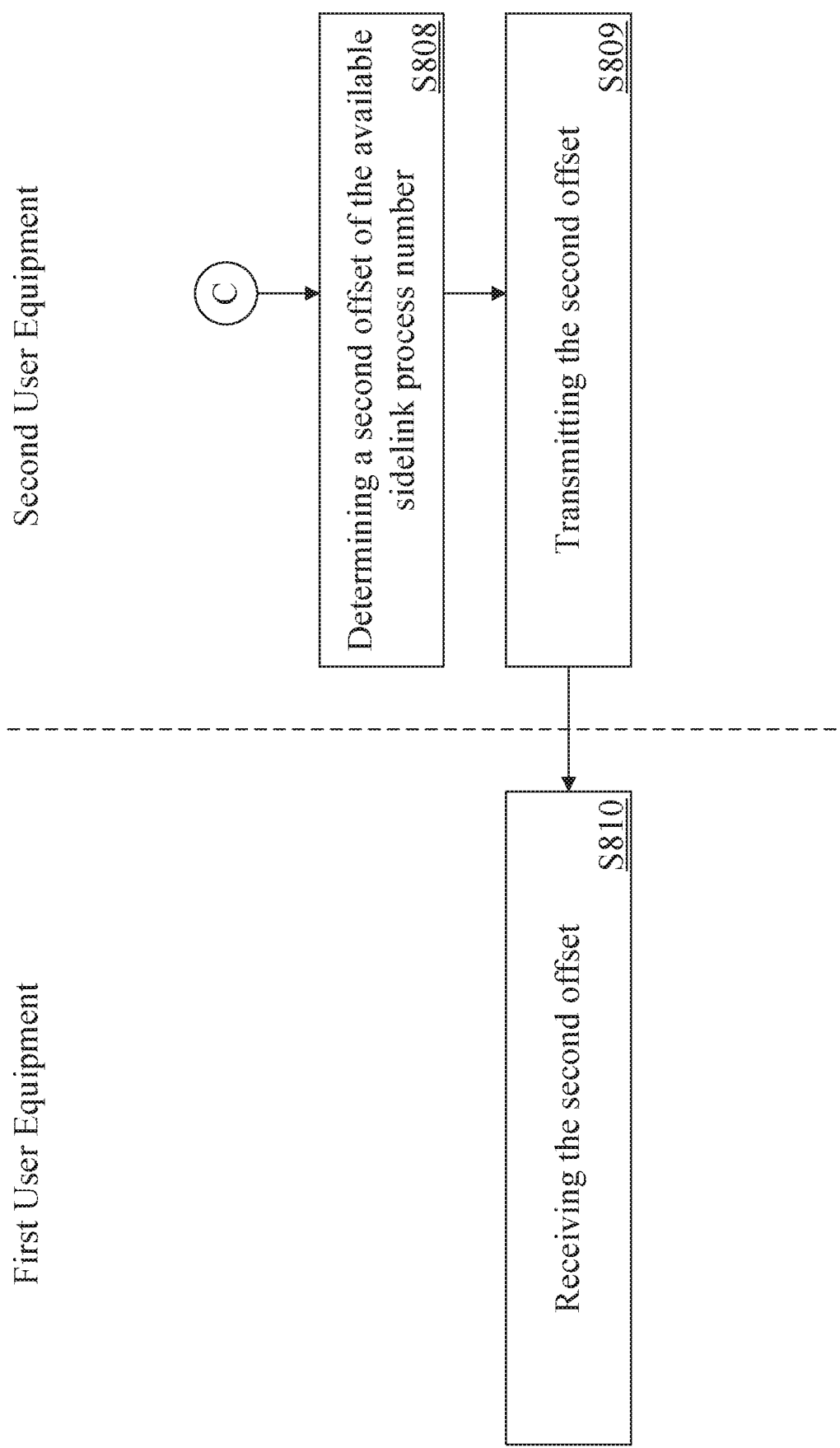

Some embodiments of the present disclosure include a method, and flowchart diagrams thereof are shown in FIGS. 8A to 8C. The method of some embodiments is for use in a network system (e.g., the network system of the aforesaid embodiments), wherein the network system includes a first user equipment and a second user equipment (e.g., the user equipment of the aforesaid embodiments). Detailed operations of the method are described below.

In some embodiments, operation S801 is executed to determine, by the second user equipment, a required sidelink process information. The required sidelink process information includes a required sidelink process number. Operation S802 is executed to transmit, by the second user equipment, the required sidelink process number to the first user equipment. Operation S803 is executed to receive, by the first user equipment, the required sidelink process number from the second user equipment.

To enable the other user equipment to perform sidelink communication based on the available resource of the first user equipment, operation S804 is executed to determine, by the first user equipment, an available sidelink process information which may include an available sidelink process number for receiving data on SL-SCH. It should be noted that, in some embodiments, operation S804 may be executed: (1) before operations S801 to S803; (2) after operation S801 to S803; or (3) in parallel with operation S801 to S803.

In some embodiments, the available sidelink processes of the first user equipment may be increased or decreased due to the sidelink communication disconnection from or connection, respectively, of the first user equipment to other user equipment. Accordingly, the first user equipment may notify the second user equipment of the increase or decrease in the available sidelink processes for receiving data on SL-SCH. Referring to FIG. 8B, when the first user equipment disconnects from or connects with another user equipment, the sidelink processes with another user equipment may be released or consumed respectively. Therefore, operation S805, in FIG. 8B, is executed to determine, by the first user equipment, a first offset of the available sidelink process number based on the released or consumed sidelink processes. Operation S806 is executed to transmit, by the first user equipment, the first offset to the second user equipment for notifying the second user equipment of the increase or decrease in the available sidelink processes. Operation S807 is executed to receive, by the second user equipment, the first offset from the first user equipment. The first offset may be a variable of the available sidelink process number.

In some embodiments, the required sidelink processes of the second user equipment may be increased or decreased. Accordingly, the second user equipment may notify the first user equipment of the corresponding increase or decrease of the number of required sidelink processes for receiving data on SL-SCH. Referring to FIG. 8C, operation S808 is executed to determine, by the second user equipment, a second offset of the required sidelink process number. Operation S809 is executed to transmit, by the second user equipment, the second offset to the first user equipment for notifying the first user equipment of the increase or decrease in the number of the required sidelink processes. Operation S810 is executed to receive, by the first user equipment, the second offset from the second user equipment. The second offset may be a variable of the required sidelink process number.

In some embodiments, when the first user equipment has only one Media Access Control (MAC) entity and the first user equipment connects with multiple second user equipment via the MAC entity, Hybrid Automatic Repeat request (HARQ) processes of the first user equipment may be shared by the multiple second user equipment. In this situation, the available sidelink process number may be an HARQ process number. The maximum sidelink process number may be a maximum HARQ process number. The used sidelink process number may be a used HARQ number. Further, the maximum HARQ process number corresponds to a total soft buffer size of a soft buffer for receiving data on SL-SCH. The used HARQ process number corresponds to a used soft buffer size of the total soft buffer size. The available HARQ process number corresponds to an available soft buffer size of the total soft buffer size. Consequently, the available soft buffer size is a difference between the used soft buffer size and the total soft buffer size.

Figure 9A:
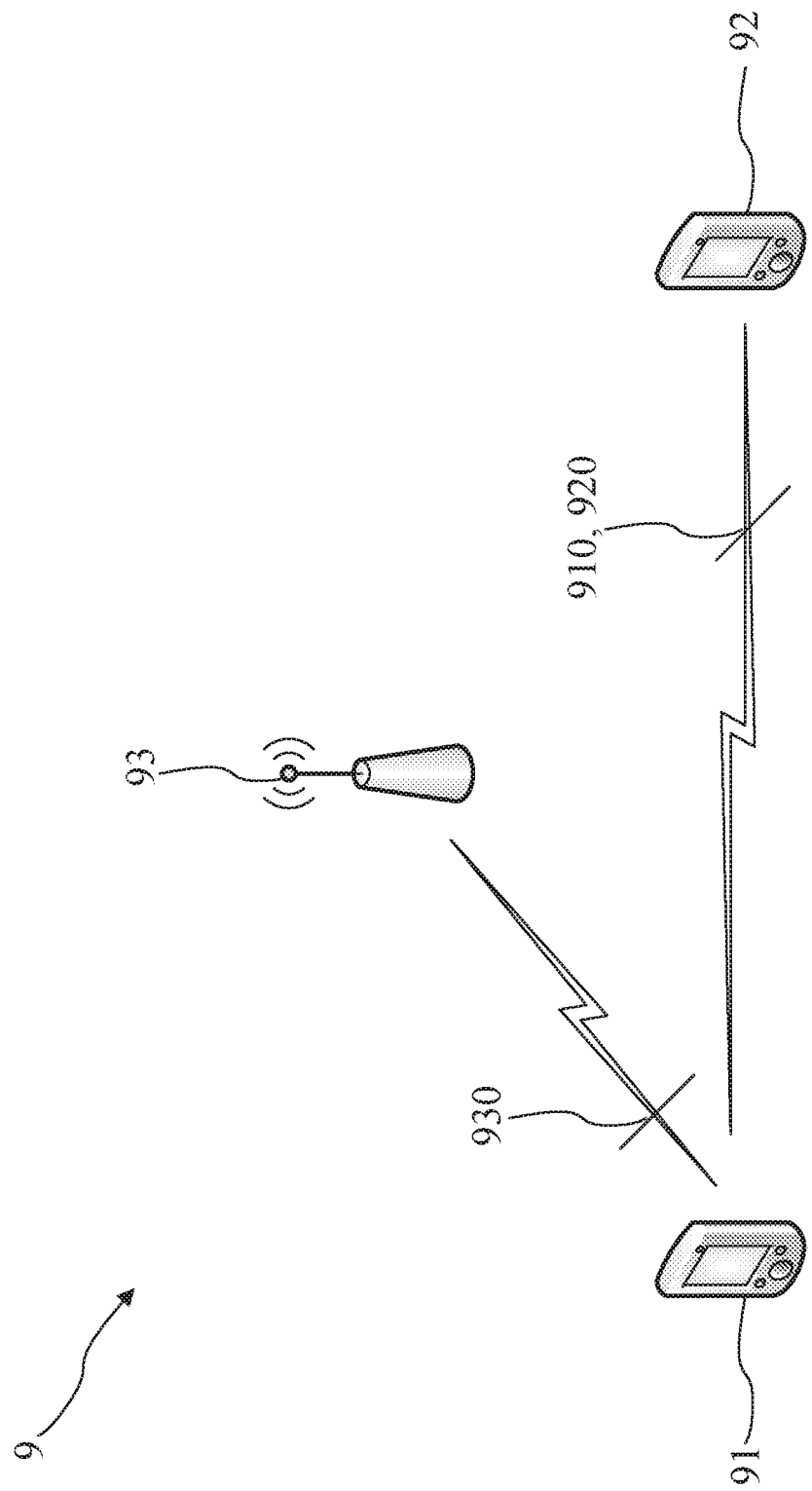
FIG. 9A is a schematic views of a network system according to an embodiment of the present disclosure.
Figure 9B:
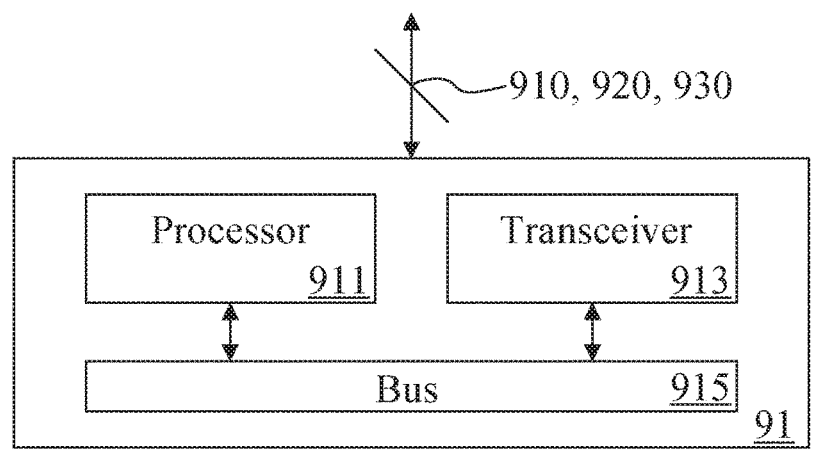
FIG. 9B is a block diagram of a first user equipment according to an embodiment of the present disclosure.

Please refer to FIG. 9A to FIG. 9D. FIG. 9A is a schematic views of a network system 9 according to an embodiment of the present disclosure. The network system 9 may include a first user equipment 91, a second user equipment 92 and a base station 93. FIG. 9B is a block diagram of the first user equipment 91 according to the embodiment of the present disclosure. The first user equipment 91 includes a processor 911 and a transceiver 913. The processor 911 and the transceiver 913 are coupled through a communication bus 915 allowing the processor 911 to control the transceiver 913 to transmit and/or receive information.

Figure 9C:
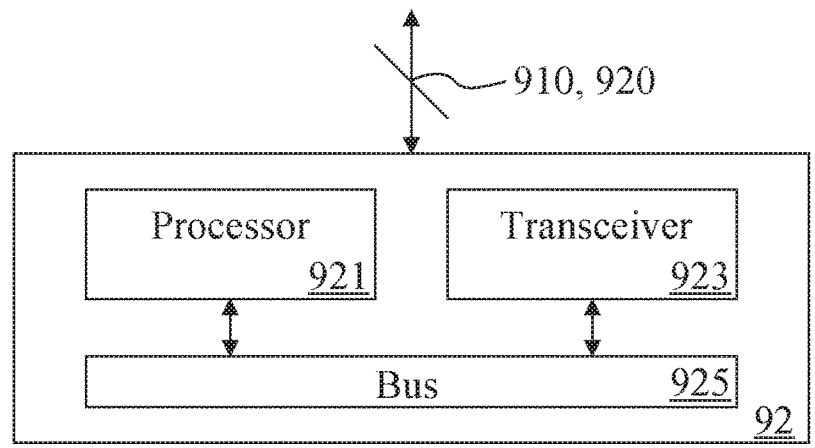
FIG. 9C is a block diagram of a second user equipment according to an embodiment of the present disclosure.
Figure 9D:
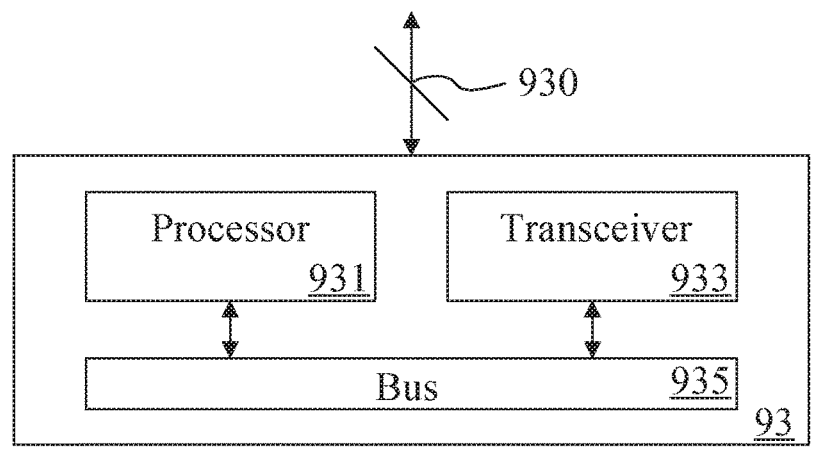
FIG. 9D is a block diagram of a base station according to an embodiment of the present disclosure.

FIG. 9C is a block diagram of the second user equipment 92 according to the embodiment of the present disclosure. The second user equipment 92 includes a processor 921 and a transceiver 923. The processor 921 and the transceiver 923 are coupled through a communication bus 915 allowing the processor 921 to control the transceiver 923 to transmit and/or receive information. FIG. 9D is a block diagram of the base station 93 according to the embodiment of the present disclosure. The base station 93 includes a processor 931 and a transceiver 933. The processor 931 and the transceiver 933 are coupled through a communication bus 935 allowing the processor 931 to control the transceiver 933 to transmit and/or receive information. The interactions between the individual elements will be further described hereinafter.

In some embodiments, the processor 911 of the first user equipment 91 determines Channel Busy Ratio (CBR) information 910, and the transceiver 913 of the first user equipment 91 transmits the CBR information 910 to the second user equipment 92. On the other hand, the transceiver 923 of the second user equipment 92 receives the CBR information 910 from the first user equipment 91.

It should be noted that, in some embodiments, the transmission of the CBR information 910 from the first user equipment 91 to the second user equipment 92 may be triggered by the second user equipment 92. In detail, when the second user equipment 92 needs the CBR information of the first user equipment 91, the processor 921 of the second user equipment 92 may control the transceiver 923 to transmit an CBR information request 920 to the first user equipment 91. Accordingly, the first user equipment 91 may transmits the CBR information 910 to the second user equipment 92 in response to the CBR information request 920.

In some embodiments, the transmission of the CBR information 910 from the first user equipment 91 to the second user equipment 92 may be triggered by the base station 93. In detail, the processor 931 of the base station 93 may control the transceiver 933 to transmit a CBR information request 930 to the first user equipment 91. Accordingly, the first user equipment 91 may transmits the CBR information 910 to the second user equipment 92 in response to the CBR information request 930.

Figure 10:
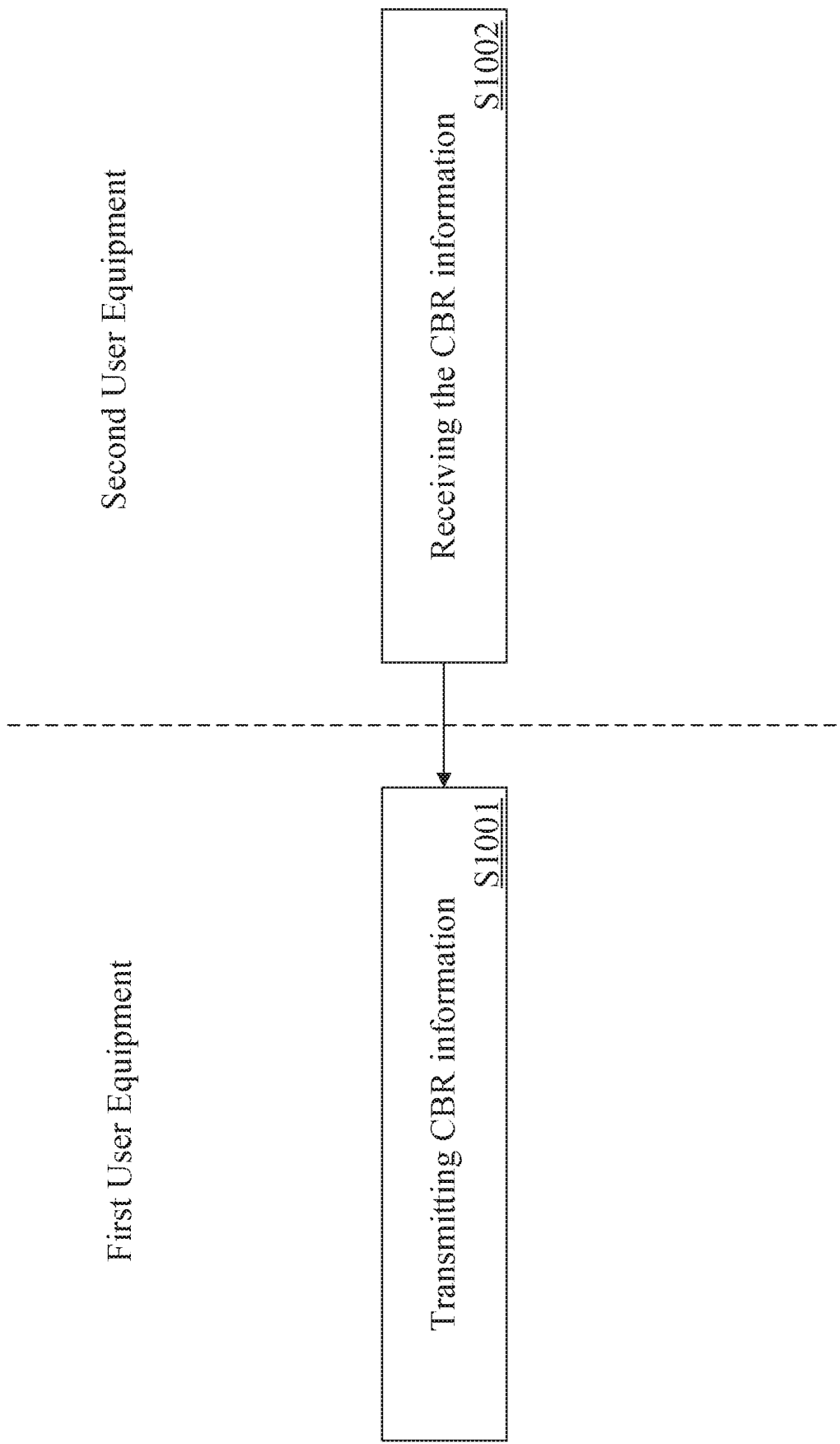
FIG. 10 is a flowchart diagram according to embodiments of the present disclosure.

Some embodiments of the present disclosure include a method, and a flowchart diagram thereof is shown in FIG. 10. The method of some embodiments is for use in a network system (e.g., the network system of the aforesaid embodiments), wherein the network system includes a first user equipment and a second user equipment (e.g., the user equipment of the aforesaid embodiments). Detailed operations of the method are described below.

For the second user equipment to have CBR information of the first user equipment, operation S1001 is executed to transmit, by the first user equipment, CBR information to the second user equipment. Operation S1002 is executed to receive, by the second user equipment, the CBR information from the first user equipment.

Figure 11A:
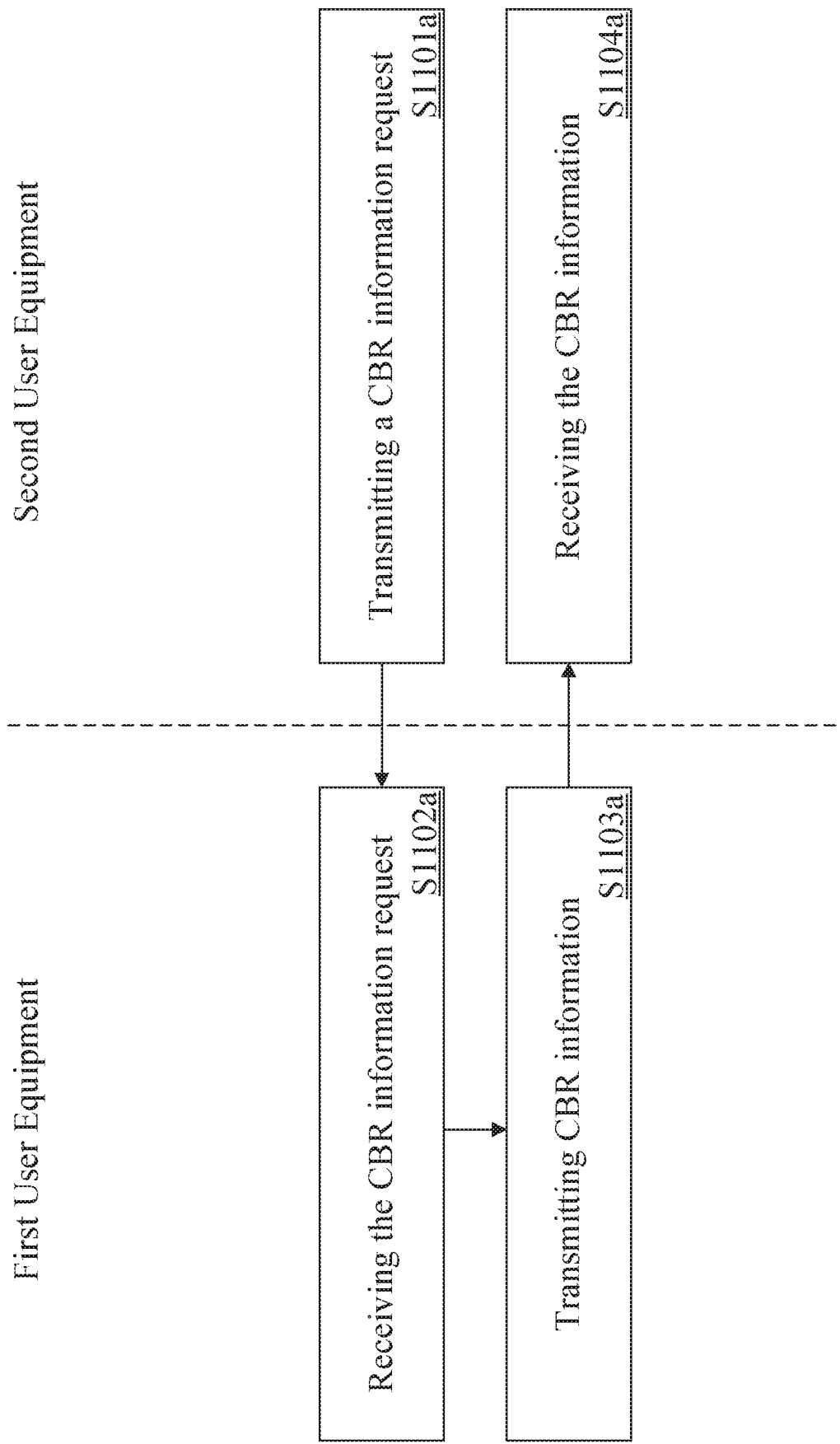
FIGS. 11A to 11B are flowchart diagrams according to embodiments of the present disclosure.

Some embodiments of the present disclosure include a method, and a flowchart diagram thereof is shown in FIG. 11A. The method of some embodiments is for use in a network system (e.g., the network system of the aforesaid embodiments), wherein the network system includes a first user equipment and a second user equipment (e.g., the user equipment of the aforesaid embodiments). Detailed operations of the method are described below.

In some embodiments, when the second user equipment needs CBR information of the first user equipment, the second user equipment may trigger the information exchange. Operation S1101a is executed to transmit, by the second user equipment, a CBR information request to the first user equipment. Operation S1102a is executed to receive, by the first user equipment, the CBR information request from the second user equipment. Operation S1103a is executed to transmit, by the first user equipment, CBR information to the second user equipment in response to the CBR information request. Operation S1104a is executed to receive, by the second user equipment, the CBR information from the first user equipment.

Figure 11B:
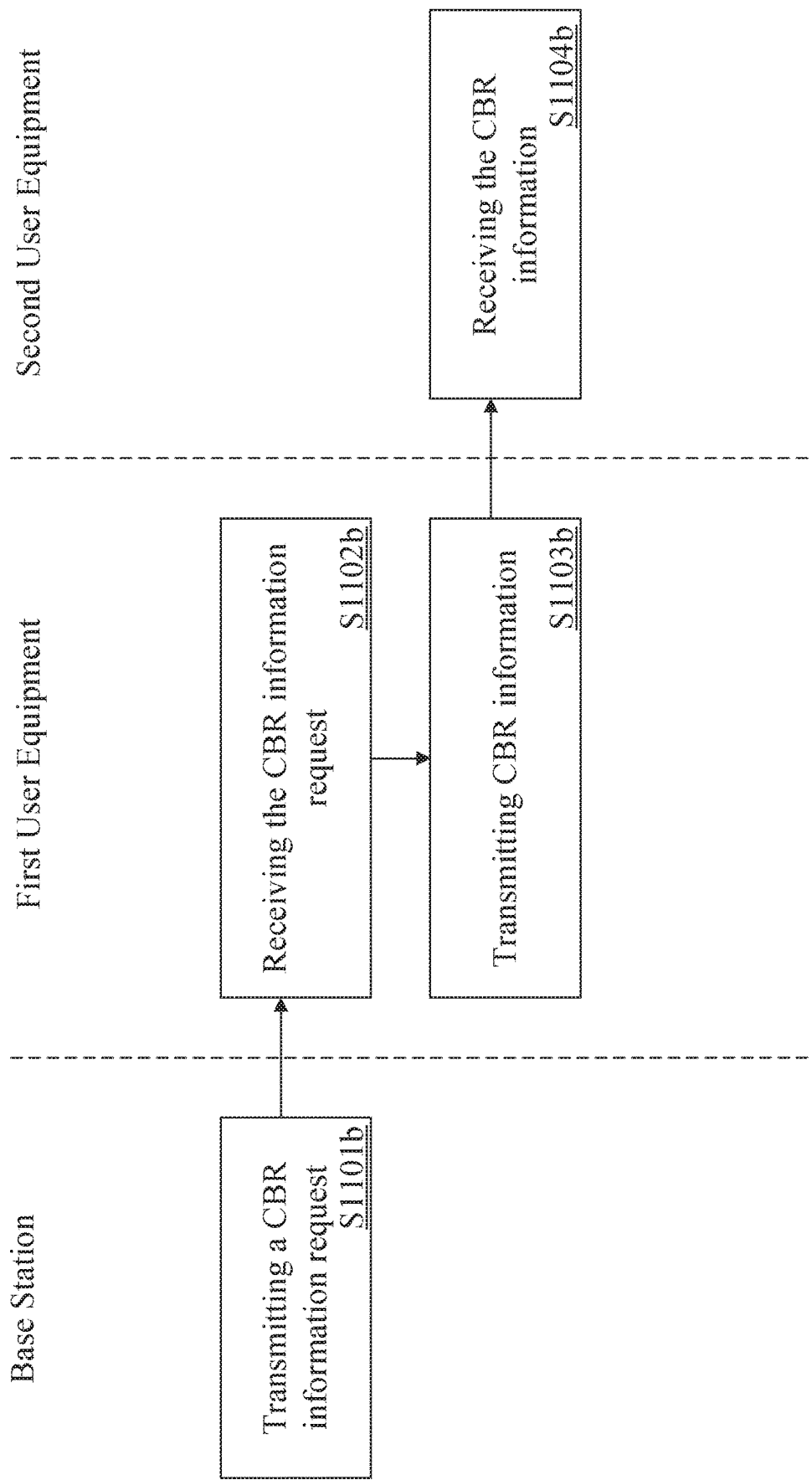

It should be noted that, in some embodiments, a base station may be introduced for scheduling the second user equipment to have the CBR information of the first user equipment, and the transmission of the CBR information may be triggered by the base station. A flowchart diagram thereof is shown in FIG. 11B.

Operation S1101b is executed to transmit, by the base station, a CBR information request to the first user equipment. Operation S1102b is executed to receive, by the first user equipment, the CBR information request from the base station. Operation S1103b is executed to transmit, by the first user equipment, the CBR information to the second user equipment in response to the CBR information request. Operation S1104b is executed to receive, by the second user equipment, the CBR information from the first user equipment.

It shall be particularly appreciated that the processors mentioned in the above embodiments may be a central processing unit (CPU), other hardware circuit elements capable of executing relevant instructions, or combination of computing circuits that are well-known by those skilled in the art based on the above disclosures. Moreover, the transceivers mentioned in the above embodiments may be a combination of a network data transmitter and a network data receiver. Further, the bus may a communication interface for transferring data between CPU and transceiver, and may include electrical bus interface, optical bus interface or even wireless bus interface. However, such description is not intended to limit the hardware implementation embodiments of the present disclosure.

In some embodiments, the network system, which includes the first user equipment, the second user equipment and the base station, may be implemented as V2X architecture under an NR network. The first user equipment and the second user equipment may communicate with each other via a V2X sidelink interface. The user equipment may communicate with the base station via a V2X Uulink. However, it is not intended to limit the implementation embodiments of the present disclosure.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method for a user equipment (UE), the method comprising:
   determining, by the UE, an available sidelink process information; and
   transmitting, by the UE, the available sidelink process information to another UE or to a base station, wherein the available sidelink process information indicates, to the another UE or to the base station, an availability of the UE to receive data, wherein the available sidelink process information comprises an available sidelink process number which is a difference between a maximum sidelink process number and a used sidelink process number.

2. The method of claim 1, further comprising:
   receiving, by the UE, an available sidelink process request from the another UE;
   wherein transmitting the available sidelink process information further comprises:
      transmitting, by the UE, the available sidelink process information to the another UE in response to the available sidelink process request.

3. The method of claim 1, further comprising:
   receiving, by the UE, an available sidelink process request from the base station;
   wherein transmitting the available sidelink process information further comprises:
      transmitting, by the user equipment, the available sidelink process information to the base station in response to the available sidelink process request.

4. The method of claim 1, further comprising:
   receiving, by the UE, a required sidelink process information from the another UE.

5. The method of claim 4, wherein the required sidelink process information comprises a required sidelink process number, and the method further comprises:
   receiving, by the UE, an offset of the required sidelink process number from the another UE, wherein the offset is a variable of the required sidelink process number.

6. The method of claim 4, wherein the required sidelink process information comprises a required sidelink process number, the available sidelink process information comprises an available sidelink process number, and the method further comprises:
   determining, by the UE, that the required sidelink process number is greater than the available sidelink process number of the UE;
   wherein the available sidelink process information further comprises a rejection signal.

7. The method of claim 4, wherein the required sidelink process information comprises a required sidelink process number, the available sidelink process information comprises an available sidelink process number, and the method further comprises:
- determining, by the UE, that the required sidelink process number is greater than the available sidelink process number; and
- establishing, by the UE, a sidelink communication connection with the another UE based on the available sidelink process number.

8. The method of claim 4, wherein the required sidelink process information comprises a required sidelink process number, the available sidelink process information comprises an available sidelink process number and an unavailable sidelink process number, the unavailable sidelink process number is a difference between the available sidelink process number and the required sidelink process number, and the method further comprises:
- determining, by the UE, that the required sidelink process number is greater than the available sidelink process number;
- wherein transmitting the available sidelink process information to the another UE further comprises:
- transmitting, by the UE, the unavailable sidelink process number to the another UE.

9. The method of claim 1, wherein the available sidelink process information comprises an available sidelink process number, and the method further comprises:
- determining, by the UE, an offset of the available sidelink process number, wherein the offset is a variable of the available sidelink process number; and
- transmitting, by the UE, the offset to the another UE.

10. The method of claim 1, wherein the maximum sidelink process number corresponds to a plurality of soft channel bits, the used sidelink process number corresponds to a plurality of used soft channel bits of the plurality of soft channel bits, the available sidelink process number corresponds to a plurality of available soft channel bits of the plurality of soft channel bits, and the plurality of available soft channel bits is a difference between the plurality of used soft channel bits and the plurality of soft channel bits.

11. A method for a user equipment (UE), the method comprising:
- receiving, by the UE, an available sidelink process information from another UE, wherein the available sidelink process information indicates an availability of the another UE to receive data;
- wherein the available sidelink process information is determined by the UE; and
- transmitting, by the UE, an available sidelink process request to the another UE, wherein the available sidelink process information comprises an available sidelink process number which is a difference between a maximum sidelink process number and a used sidelink process number.

12. The method of claim 11, further comprising:
- determining, by the UE, a required sidelink process information;
- transmitting, by the UE, the required sidelink process information to the another UE.

13. The method of claim 12, wherein the required sidelink process information comprises a required sidelink process number, the available sidelink process information comprises an available sidelink process number, the required sidelink process number is greater than an available sidelink process number of the another UE, and the available sidelink process information further comprises a rejection signal.

14. A user equipment (UE), comprising:
- at least one memory; and
- at least one processor coupled with the at least one memory and configured to cause the UE to:
  - determine an available sidelink process information; and
  - transmit the available sidelink process information to another user equipment or a base station, wherein the available sidelink process information indicates, to the another UE or to the base station, an availability of the UE to receive data, wherein the available sidelink process information comprises an available sidelink process number which is a difference between a maximum sidelink process number and a used sidelink process number.

15. The UE of claim 14, wherein the at least one processor is further configured to cause the at least one processor to receive an available sidelink process request from the another UE, and transmit the available sidelink process information to the another UE in response to the available sidelink process request.

16. The UE of claim 14, wherein the at least one process is further configured to cause the at least one processor to receive an available sidelink process request from the base station, and transmit the available sidelink process information to the base station in response to the available sidelink process request.

17. The UE of claim 14, wherein the at least one process is further configured to cause the at least one processor to receive a required sidelink process information from the another UE.

18. The UE of claim 17, wherein:
- the required sidelink process information comprises a required sidelink process number;
- the available sidelink process information comprises an available sidelink process number;
- the at least one processor is further configured to cause the UE to determine that the required sidelink process number is greater than the available sidelink process number of the user equipment; and
- the available sidelink process information further comprises a rejection signal.

* * * * *